United States Patent
Wu et al.

(10) Patent No.: US 9,166,696 B2
(45) Date of Patent: Oct. 20, 2015

(54) UPSAMPLING OPTICAL TRANSMITTER

(71) Applicant: Infinera Corp., Annapolis Junction, MD (US)

(72) Inventors: Kuang-Tsan Wu, Kanata (CA); John D. McNicol, Ottawa (CA); David F. Welch, Atherton (CA); Stephen G. Grubb, Reisterstown, MD (US); Pierre Mertz, Baltimore, MD (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 14/471,832

(22) Filed: Aug. 28, 2014

(65) Prior Publication Data

US 2014/0369698 A1 Dec. 18, 2014

Related U.S. Application Data

(62) Division of application No. 12/897,786, filed on Oct. 5, 2010, now Pat. No. 8,831,439.

(51) Int. Cl.
*H04B 10/06* (2006.01)
*H04B 10/516* (2013.01)
*H04B 10/2575* (2013.01)

(52) U.S. Cl.
CPC .......... *H04B 10/516* (2013.01); *H04B 10/2575* (2013.01)

(58) Field of Classification Search
CPC ......... H04J 14/06; H04J 14/026; H04J 14/02; H04J 14/002; H04B 10/616; H04B 10/532; H04B 10/60; H04B 10/611; H04B 10/61; H04B 10/6165; H04B 10/63; H04B 10/614; H04B 10/64; H04L 27/00; H04L 7/0029
USPC .............. 398/140, 182–188, 202–214, 79, 91
See application file for complete search history.

(56) References Cited

U.S. PATENT DOCUMENTS 4,483,000 A    11/1984 Yamamoto et al. ........... 370/347
4,528,565 A *  7/1985 Hauptmann ..................... 342/91

(Continued)

OTHER PUBLICATIONS

Michael G. Taylor, "Coherent Detection Method Using DSP for Demodulation of Signal and Subsequent Equalization of Propagation Impairments," IEEE Photonics Technology Letters, vol. 16, No. 2, Feb. 2004, pp. 674-676.

(Continued)

*Primary Examiner* — Hibret Woldekidan
(74) *Attorney, Agent, or Firm* — Dunlap Codding PC; David L. Soltz

(57) ABSTRACT

An apparatus including a photodiode, a low pass filter, an analog-to-digital converter, an interpolation circuit and a digital signal processor is disclosed. The photodiode receives a portion of a plurality of optical signals, each of which is modulated in accordance with a corresponding one of a plurality of data streams, and each having a corresponding one of a plurality of wavelengths. The photodiode supplies an electrical output. The low-pass filter supplies a filtered output in response to the electrical output. The analog-to-digital converter is configured to sample the filtered output at a first sampling rate to generate a plurality of first data samples. The interpolation circuit is configured to receive the plurality of first data samples and supply a plurality of second data samples at a second sampling rate less the first sampling rate. The digital signal processor circuit is configured to receive the plurality of second data samples.

3 Claims, 18 Drawing Sheets

(56) References Cited

U.S. PATENT DOCUMENTS

| | | | |
|---|---|---|---|
| 6,563,880 B1 | 5/2003 | Hunsinger et al. | 375/260 |
| 7,266,306 B1 | 9/2007 | Harley et al. | 398/182 |
| 8,184,992 B2* | 5/2012 | Kikuchi | 398/202 |
| 8,477,656 B2* | 7/2013 | O'Mahony | 370/254 |
| 8,655,190 B2* | 2/2014 | Wu et al. | 398/202 |
| 8,682,180 B1* | 3/2014 | Nimon et al. | 398/202 |
| 8,730,079 B2* | 5/2014 | Tudose | 341/161 |
| 8,768,177 B2* | 7/2014 | Wu et al. | 398/194 |
| 8,861,977 B2* | 10/2014 | McNicol et al. | 398/201 |
| 8,989,593 B2* | 3/2015 | Sun et al. | 398/155 |
| 9,048,957 B2* | 6/2015 | Nakashima | 1/1 |
| 2002/0122518 A1* | 9/2002 | Yasuda et al. | 375/372 |
| 2004/0252996 A1 | 12/2004 | McNicol | 398/79 |
| 2006/0269295 A1 | 11/2006 | Way | 398/183 |
| 2007/0092263 A1 | 4/2007 | Agazzi | 398/188 |
| 2009/0238580 A1 | 9/2009 | Kikuchi | 398/192 |
| 2010/0021166 A1* | 1/2010 | Way | 398/79 |
| 2010/0142964 A1 | 6/2010 | Chang et al. | 398/116 |
| 2011/0097092 A1* | 4/2011 | Wagner et al. | 398/202 |

OTHER PUBLICATIONS

K. Roberts, et al, "Performance of dual-polarization QPSK for optical transport systems," JLT, vol. 27, No. 16, pp. 3546-3559, Aug. 2009.

S.J. Savory, et al, "Digital equalisation of 40Gbit/s per wavelength transmission over 2480 km of standard fibre without optical dispersion compensation," ECOC 2006, paper Th2.5.5.

H. Sun, et al, "Real-time measurements of a 40 Gb/s coherent system," Opt. Express 16, 2008, pp. 873-879.

* cited by examiner

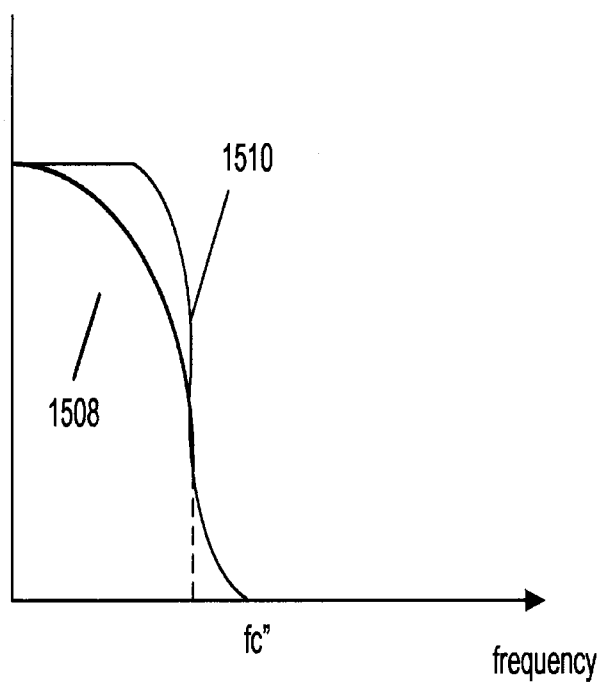

UPSAMPLING OPTICAL TRANSMITTER

INCORPORATION BY REFERENCE

The present patent application is a divisional of U.S. Ser. No. 12/897,786, filed Oct. 5, 2010, the entire contents of which are hereby incorporated herein by reference in their entirety.

BACKGROUND

Wavelength division multiplexed (WDM) optical communication systems are known in which multiple optical signals or channels, each having a different wavelength, are combined onto an optical fiber. Such systems typically include a laser associated with each wavelength, a modulator configured to modulate the optical signal output from the laser, and an optical combiner to combine each of the modulated optical signals. Such components are typically provided at a transmit end of the WDM optical communication system to transmit the optical signals onto the optical fiber. At a receive end of the WDM optical communication system, the optical signals are often separated and converted to corresponding electrical signals that are then processed further.

Preferably, the information carrying capacity of an optical communication system should be optimized to carry a maximum amount of data over a maximum length of optical fiber. In optimizing the capacity, however, certain trade-offs are often made. For example, certain modulation formats may be employed to modulate the optical signals to carry data at higher rates. Such higher rate modulation formats, however, are typically more susceptible to noise, and, therefore, may not be used in transmission of optical signals over relatively long distances.

Capacity may be further increased by transmitting a relatively large number of channels over the optical fiber. Trade-offs, however, are encountered here as well. For example, when increased numbers of channels are provided, each channel is typically provided spectrally close to each other, thereby increasing error rates due to cross-talk, as well as non-linear effects, such as cross-phase modulation (XPM). Moreover, the susceptibility of channel to cross-talk, non-linear effects, and noise are often wavelength dependent. Thus, a channel at one wavelength may have more or fewer errors due to XPM or other non-linear effects compared to a channel at another wavelengths. Accordingly, a maximum capacity may be achieved by optimizing the above noted parameters, such as modulation format, distance, and channel spacing. Such optimized capacity may require non-uniformly spaced channels, for example.

Optical demultiplexers are often employed to separate or demultiplex the combined optical signals. Typically, such optical demultiplexers include optical components that have a fixed bandwidth to select optical signals having a particular wavelength. Accordingly, since different WDM optical communication systems extend over different lengths of fiber, include different types of fiber, and may have other differing characteristics, optical demultiplexers must be tailored for each WDM optical communication system if each such system is to have optimized capacity. As a result, such tailored optical demultiplexers are typically expensive.

Moreover, the wavelengths associated with each optical signal are often uniformly spaced from each other so as to conform to a so-called standardized "grid." In one such wavelength grid, standardized by the International Telecommunications Union (ITU), wavelengths are spectrally spaced from one another by 50 GHz. Such 50 GHz spaced wavelengths or grid wavelengths include 1569.18 nm, 1568.36 nm, 1567.54 nm, etc. Typically, systems that transmit optical signals having wavelengths conforming to the ITU grid do not transmit optical signals having wavelengths between the grid wavelengths. Thus, such systems may not have a channel spacing or other optimized parameters to provide maximum capacity.

An optical communication system is therefore needed that has flexible channel spacing and bandwidth so that the capacity of such a system can be optimized for a given fiber type and distance, as well as other system parameters.

SUMMARY

Consistent with an aspect of the present disclosure, an apparatus is provided that comprises a plurality of optical transmitters, each of which being configured to supply a corresponding one of a plurality of first optical signals. Each of the plurality of first optical signals has a corresponding one of a plurality of wavelengths and carries a corresponding one of a plurality of data streams. The apparatus also includes an optical combiner configured to combine the plurality of first optical signals onto an optical path, and a photodiode configured to receive a portion of each of the plurality of first optical signals and supply a first electrical signal. A local oscillator laser is also provided, such that at least a portion of a second optical signal output from the local oscillator is also supplied to the photodiode. In addition, circuitry is provided that is circuitry configured to receive the first electrical signal and supply a second electrical signal in response to the first electrical signal. The circuitry includes an electronic filter having a variable bandwidth, and the second electrical signal carries one of the plurality of data streams.

Consistent with an additional aspect of the present disclosure, an apparatus is provided that comprises a digital signal processor circuit configured to receive input data. The digital signal processor is configured to sample or receive the input data at a first sampling or baud rate, and spectrally shape the input data to supply spectrally shaped data as a first plurality of data samples at the first sampling rate or baud rate. An interpolation circuit is also provided that receives the first plurality of data samples at the first sampling rate and outputs the spectrally shaped data as a second plurality of data samples at a second sampling rate greater than the first sampling rate. A digital-to-analog converter circuit is also provided that is configured to receive the second plurality of data samples and generate an analog signal. The apparatus further includes a modulator circuit and a laser configured to supply light to the modulator circuit, the modulator circuit being configured to modulate the light to supply a modulated optical signal in response to the analog signal.

Moreover, consistent with a further aspect of the present disclosure, an apparatus is provided that comprises a photodiode that receives a portion of each of a plurality of optical signals, each of which being modulated in accordance with a corresponding one of a plurality of data streams, and each having a corresponding one of a plurality of wavelengths. The photodiode supplies an electrical output, such that each of the plurality of optical signals is supplied by a corresponding one of a plurality of transmitters. In addition, a low-pass filter is provided that supplies a filtered output in response to the electrical output, and an analog-to-digital converter is provided that is configured to sample the filtered output at a first sampling rate to generate a plurality of first data samples. In addition, an interpolation circuit is provided that is configured to receive the plurality of first data samples and supply a plurality of second data samples at a second sampling rate less the first sampling rate. Further, a digital signal processor circuit is provided that is configured to receive the plurality of second data samples.

Consistent with an additional aspect of the present disclosure, a system is provided that comprises a first transmitter including a first digital signal processor circuit configured to receive input data. The digital signal processor is configured to sample the input data at a first sampling rate, and spectrally shape the input data to supply spectrally shaped data as a first plurality of data samples at the first sampling rate. The transmitter also includes a first interpolation circuit that receives the first plurality of data samples at the first sampling rate and outputs the spectrally shaped data as a second plurality of data samples at a second sampling rate greater than the first sampling rate. In addition, the transmitter includes a digital-to-analog converter circuit configured to receive the second plurality of data samples and generate an analog signal. Further, a modulator circuit, and a laser is provided that is configured to supply light to the modulator circuit. The modulator circuit is configured to modulate the light to supply a first modulated optical signal in response to the analog signal. The apparatus also includes a second transmitter that supplies a second modulated optical signal. The apparatus also includes a combiner configured to combine the first modulated optical signal with the second modulated optical signal onto an optical communication path. Further, the system includes a receiver coupled to the optical communication path. The receiver includes a photodiode that receives portions the first and second modulated optical signals. The photodiode supplies an electrical output to a low-pass filter, which, in turn, supplies a filtered output in response to the electrical output. The receiver also includes an analog-to-digital converter configured to sample the filtered output at the second sampling rate to generate a plurality of third data samples, and a second interpolation circuit configured to receive the plurality of third data samples and supply a plurality of fourth data samples at a third sampling rate less than the second sampling rate. The receiver also includes a second digital signal processor circuit configured to receive the plurality of fourth data samples.

Consistent with a further aspect of the present disclosure, an apparatus is provided that comprises a digital signal processor circuit configured to receive input data. The digital signal processor is configured to sample the input data at a first sampling rate, and spectrally shape the input data to supply spectrally shaped data as a first plurality of data samples at the first sampling rate. An interpolation circuit is also provided that receives the first plurality of data samples at the first sampling rate and outputs the spectrally shaped data as a second plurality of data samples at a second sampling rate greater than the first sampling rate. In addition, a digital-to-analog converter circuit is provided that is configured to receive the second plurality of data samples and generate an analog signal. Further, a low-pass filter is provided, such that the analog signal is supplied to the low pass filter, and the low-pass filter outputs a filtered signal in response to the analog signal. The low pass filter has an associated roll-off factor, the roll-off factor being adjusted in response to a control input. In addition, a modulator circuit and a laser are provided, such that the laser supplies light to the modulator circuit, and the modulator circuit is configured to modulate the light to supply a modulated optical signal in response to the filtered signal.

Consistent with a further aspect of the present disclosure, an apparatus is provided that comprises a forward error correction (FEC) encoder circuit configured to receive input data, such that, in response to a first control input, the FEC encoder circuit generates first error correcting bits, and, in response to a second control input, the FEC encoder generates second error correcting bits, a number of the second error correcting bits being greater than a number of the first error correcting bits. The apparatus further includes a plurality of optical transmitters, each of which being configured to supply a corresponding one of a plurality of first optical signals. Each of the plurality of first optical signals has a corresponding one of a plurality of wavelengths and carries a corresponding one of a plurality of data streams, one of the plurality of data streams including one of the first error correcting bits and the second error correcting bits. An optical combiner is also provided that is configured to combine the plurality of first optical signals onto an optical path. In addition, a photodiode is provided that is configured to receive a portion of each of the plurality of first optical signals and supply a first electrical signal. Further, a local oscillator laser is provided, such that at least a portion of a second optical signal output from the local oscillator is supplied to the photodiode. Moreover, circuitry is provided that is configured to receive the first electrical signal and supply a second electrical signal in response to the first electrical signal. The circuitry includes an electronic filter having a first bandwidth when the first error correcting bits are included in said one of the plurality of data streams and a second bandwidth when the second error correcting bits are included in said one of the plurality of data streams. The second bandwidth is spectrally wider than the first bandwidth, and the second electrical signal carries one of the plurality of data streams.

Consistent with an additional aspect of the present disclosure, an apparatus is provided that includes a substrate and an optical splitter provided on the substrate. The optical splitter has an input and a plurality of outputs, such that the optical splitter receives a wavelength division multiplexed (WDM) optical signal including plurality of optical signals, each having a corresponding one of a plurality of wavelengths. Each of the plurality of outputs of the optical splitter supplies a corresponding one of a plurality of first portions of the WDM optical signal. A plurality of local oscillator lasers are also provided on the substrate, as well as a plurality of optical hybrid circuits. Each of the plurality of optical hybrid circuits has a first input coupled to a corresponding one of the plurality of outputs of the optical splitter and a second input configured to receive a first portion of light supplied by a corresponding one of the plurality of local oscillator lasers. Each of the plurality of optical hybrid circuits has an output that supplies a corresponding one of a plurality of second portions of the WDM optical signal and a second portion of the light supplied by a corresponding one of the plurality of local oscillator lasers, each of the plurality of second portions of the WDM optical signal including light at each of the plurality of wavelengths. Further, a plurality of photodiodes is provided on the substrate. Each of the plurality of photodiodes receives a respective one of the plurality of second portions of the WDM optical signal and the second portion of the light supplied by a corresponding one of the plurality of local oscillator circuits. Each of the plurality of photodiodes supplies a corresponding one of a plurality of electrical signals.

Consistent with an additional aspect of the present disclosure, an apparatus is provided that includes a wavelength selective switch having an input that receives a plurality of optical signals, each of which having a corresponding one of a plurality of wavelengths. The wavelength selective switch has a plurality of outputs, each of which supplying a corresponding one of a plurality of groups of the plurality of optical signals. The apparatus also includes a plurality of photonic integrated circuits, each of which being configured to receive a corresponding one of the plurality of band of the plurality of optical signals. One of plurality of photonic integrated circuits includes a substrate and an optical splitter provided on the substrate. The optical splitter has an input and a plurality of outputs, such that the optical splitter receives one of the plurality of groups, which includes a subset of the plurality of optical signals. Each optical signal within the subset of the plurality of optical signals having respective one of a subset of the plurality of wavelengths, each of the plurality of outputs of the optical splitter supplying a corresponding one of a plurality of first portions of said one of the plurality of groups. A plurality of local oscillator lasers are also provided on the substrate, as well as a plurality of optical hybrid circuits. Each of the plurality of optical hybrid circuits has a first input coupled to a corresponding one of the plurality of outputs of the optical splitter and a second input configured to receive a first portion of light supplied by a corresponding one of the plurality of local oscillator lasers. Each of the plurality of optical hybrid circuits has an output that supplies a corresponding one of a plurality of second portions of said one of the plurality of groups and a second portion of the light supplied by a corresponding one of the plurality of local oscillator lasers. Each of the plurality of second portions of said one of the plurality of groups includes light at each of the subset of the plurality of wavelengths. In addition, a plurality of photodiodes is provided on the substrate, each of which receiving a respective one of the plurality of second portions of said one of the plurality of band and the second portion of the light supplied by a corresponding one of the plurality of local oscillator circuits. Each of the plurality of photodiodes supplies a corresponding one of a plurality of electrical signals.

Consistent with an additional aspect of the present disclosure, an optical de-interleaver is provided that has an input for receiving a plurality of optical signals, each of which having a corresponding one of a plurality of wavelengths. The optical de-interleaver has a plurality of outputs, each of which supplying a corresponding one of a plurality of groups of the plurality of optical signals. The apparatus also includes a plurality of photonic integrated circuits, each of which being configured to receive a corresponding one of the plurality of band of the plurality of optical signals. One of plurality of photonic integrated circuits includes a substrate and an optical splitter provided on the substrate. The optical splitter has an input and a plurality of outputs, such that the optical splitter receives one of the plurality of groups, which includes a subset of the plurality of optical signals. Each optical signal within the subset of the plurality of optical signals having respective one of a subset of the plurality of wavelengths, each of the plurality of outputs of the optical splitter supplying a corresponding one of a plurality of first portions of said one of the plurality of groups. A plurality of local oscillator lasers are also provided on the substrate, as well as a plurality of optical hybrid circuits. Each of the plurality of optical hybrid circuits has a first input coupled to a corresponding one of the plurality of outputs of the optical splitter and a second input configured to receive a first portion of light supplied by a corresponding one of the plurality of local oscillator lasers. Each of the plurality of optical hybrid circuits has an output that supplies a corresponding one of a plurality of second portions of said one of the plurality of groups and a second portion of the light supplied by a corresponding one of the plurality of local oscillator lasers. Each of the plurality of second portions of said one of the plurality of groups includes light at each of the subset of the plurality of wavelengths. In addition, a plurality of photodiodes is provided on the substrate, each of which receiving a respective one of the plurality of second portions of said one of the plurality of band and the second portion of the light supplied by a corresponding one of the plurality of local oscillator circuits. Each of the plurality of photodiodes supplies a corresponding one of a plurality of electrical signals.

Consistent with an additional aspect of the present disclosure, an apparatus is provided that includes a first optical transmitter configured to supply a first optical signal that is modulated in accordance with a first modulation format, the first optical signal having a first wavelength and carrying a first information stream. A second optical transmitter is provided which is configured to supply a second optical signal modulated in accordance with a second modulation format and carrying a second information stream. An optical combiner is also provided that is configured to combine the first and second optical signals onto an optical path. In addition, a first photodiode is provided that is configured to receive a first portion of each of the first and second optical signals and supply a first electrical signal. Further, a second photodiode is provided that is configured to receive a second portion of each of the first and second optical signals and supply a second electrical signal. Moreover, a local oscillator laser is provided, such that portions of a third optical signal output from the local oscillator are supplied to the first and second photodiodes. First circuitry is included to receive the first electrical signal and supply a third electrical signal in response to the first electrical signal. The first circuitry includes a first electronic filter having a variable bandwidth. The third electrical signal carries data associated with the first information stream. In addition, second circuitry is provided that is configured to receive the second electrical signal and supply a fourth electrical signal in response to the first electrical signal. The second circuitry includes a second electronic filter having a variable bandwidth, and the fourth electrical signal carries data associated with the second information stream.

Consistent with an additional aspect of the present disclosure, an apparatus is provided that comprises a plurality of optical transmitters. A first one of the plurality of optical transmitter is configured to supply a first optical signal modulated in accordance with a first modulation format in response to a first control signal supplied to the first one of the plurality of optical transmitters. The first one of the plurality of optical transmitters is also configured to supply a second optical signal modulated in accordance with a second modulation format in response to a second control signal supplied to the first one of the plurality of optical transmitters. Also, a second one of the plurality of optical transmitters is configured to supply a third optical signal modulated in accordance with the first modulation format in response to a third control signal supplied to the second one of the plurality of optical transmitters. The second one of the plurality of optical transmitters also being configured to supply a fourth optical signal modulated in accordance with the second modulation format in response to a fourth control signal supplied to the second one of the plurality of optical transmitters. Also, an optical combiner is provided that is configured to combine one of the first and second optical signals and one of the third and fourth optical signals onto an optical path. Each of the plurality of optical transmitters supplies a corresponding one of a plurality of optical signals, each of which has a corresponding one of a plurality of wavelengths. One of the first and second optical signals is a first one of the plurality of optical signals, and one of the third and fourth optical signals is a second one of the plurality of optical signals. First and second adjacent ones of the plurality of wavelengths are separated from each other by a first spacing, and second and third adjacent ones of the plurality of wavelengths are separated from each other by a second spacing different than the first spacing.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

FIGS. 15a-15c illustrate examples of filter and bandwidth spectra consistent with the present disclosure;

DESCRIPTION OF THE EMBODIMENTS

Figure 1:
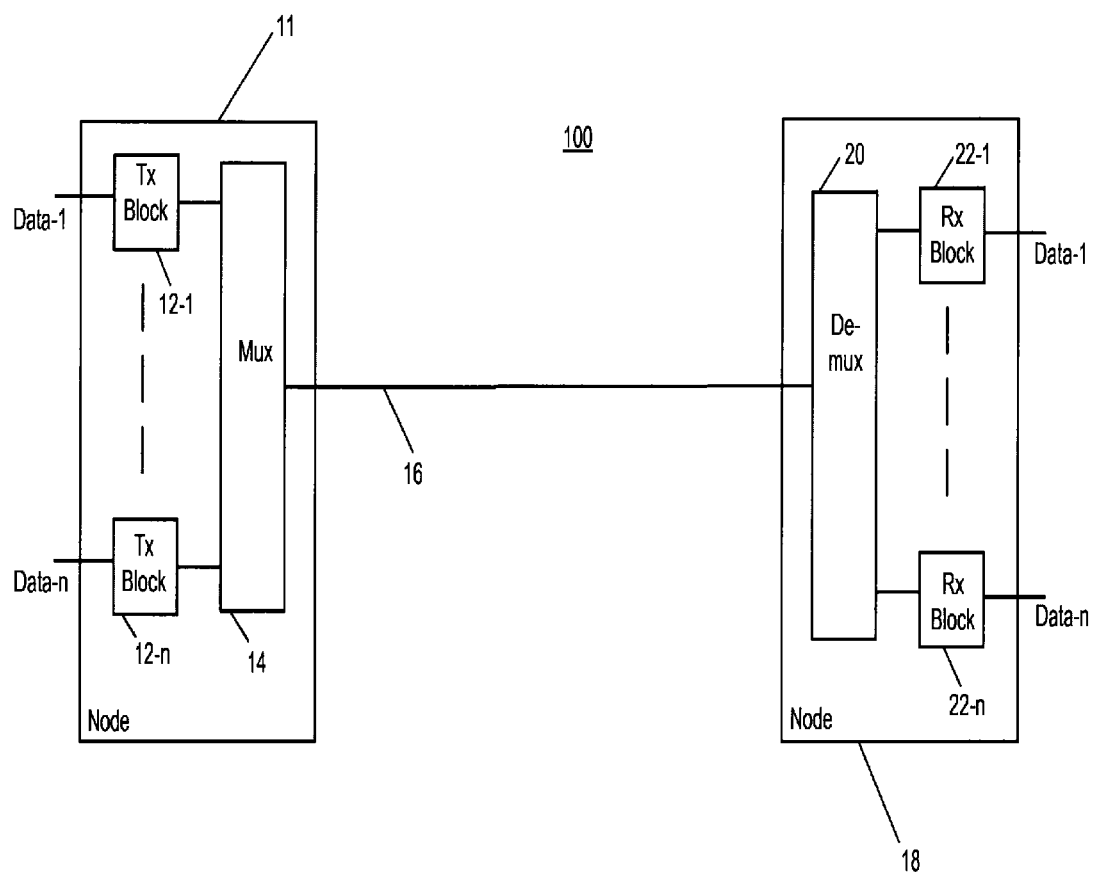
FIG. 1 illustrates an optical communication system consistent with an aspect of the present disclosure.

Consistent with the present disclosure, data, in digital form, is received by a transmit nodes of an optical communication, and converted to analog signal by a digital-to-analog converter (DAC) to drive a modulator. The modulator, in turn, modulates light at one of a plurality of wavelengths in accordance with the received data. The modulated light is then transmitted over an optical communication path to a receive node. At the receive node, the modulated optical signal, as well as other modulated optical signals may be intradyned in a known manner by combination with light from a local oscillator at one of the optical signal wavelengths to provide a baseband optical signal. The baseband optical signal, is supplied to a photodetector, which, in turn, supplies an analog electrical signal (representative of a known "down-converted" signal), that may be amplified or otherwise processed, and provided to an analog-to-digital converter (ADC). The ADC converts processed analog electrical signals into digital form. The output from the ADC is then further processed to output a copy of the data supplied to the transmit node.

In particular, such processing may include filtering electrical signals generated in response to the ADC outputs in order select data associated with one of the plurality of modulated optical signals. Since filtering is carried out electronically, i.e., in the electrical domain, instead of optically, fixed optical demultiplexers are not required. Moreover, the electrical bandwidth of the data associated with or carried by the optical signals may be readily tuned by circuitry in the transmit and receive nodes, such that the optical signals carrying such data may be spaced closer to one another or may be adjusted to accommodate different channel bandwidths.

Typically, filtering is also carried out in the transmit node in order to limit the electrical bandwidth of the data to be carried by the optical signal to be substantially equal to an associated Nyquist limit. That is, the electrical bandwidth is filtered so that the Nyquist frequency (half the sampling or symbol rate), is greater than such electrical bandwidth (or the maximum frequency component of the data). Such filtering may also be provided to minimize or eliminate interference with an adjacent channel and may be carried out by a filter in a digital signal processor in the transmit node operating on samples of the data at a first sampling rate. Such filtered samples may be supplied to the DAC, which, as noted above, supplies a corresponding analog drive signal. The filtered samples have an associated bandwidth, which corresponds to the bandwidth of the channel and also constitutes the bandwidth associated with the electronic filter of the digital signal processor. In addition to the channel bandwidth, however, the DAC generates higher frequency harmonics through known "aliasing". Such higher frequency harmonics are typically filtered with a low pass or "roofing" analog filter that filters the analog output of the DAC, otherwise such harmonics may create distortions that are sensed at the receive node and cause errors in data output from the receive node.

If the DAC operates at the same sampling rate or data rate as the baud or symbol rate of the digital signal processor or the data rate of the digital signal processor, higher frequency harmonics are generated relatively close in frequency to the channel bandwidth and cannot be effectively filtered by the roofing filter. Accordingly, consistent with the present disclosure, an interpolating circuit is provided to interpolate the data output from digital signal processor so that the DAC can operate at a higher sampling or symbol rate than the DSP or a higher data rate than the DSP. As a result, the higher frequency harmonics can be more readily filtered by the roofing filter. Thus, the interpolating circuit permits adequate filtering of the higher frequency harmonics, which, in turn, facilitates electronic filtering at the receive node with fewer errors.

Various examples of systems including electronic filtering consistent with the present disclosure are discussed below.

Reference will now be made in detail to the present exemplary embodiments of the present disclosure, which are illustrated in the accompanying drawings. Wherever possible, the same reference numbers will be used throughout the drawings to refer to the same or like parts.

FIG. 1 illustrates an optical link or optical communication system 100 consistent with an aspect of the present disclosure. Optical communication system 100 includes a plurality of transmitter blocks (Tx Block) 12-1 to 12-n provided in a transmit node 11. Each of transmitter blocks 12-1 to 12-n receives a corresponding one of a plurality of data or information streams Data-1 to Data-n, and, in response to a respective one of these data streams, each of transmitter blocks 12-1 to 12-n may output a group of optical signals or channels to a combiner or multiplexer 14. Each optical signal carries an information stream or data corresponding to each of data streams Data-1 to Data-n. Multiplexer 14, which may include one or more optical filters, for example, combines each of group of optical signals onto optical communication path 16. Optical communication path 16 may include one or more segments of optical fiber and optical amplifiers, for example, to optically amplify or boost the power of the transmitted optical signals.

As further shown in FIG. 1, a receive node 18 is provided that includes an optical combiner or demultiplexer 20, which may include one or more optical filters, for example, optical demultiplexer 20 supplies each group of received optical signals to a corresponding one of receiver blocks (Rx Blocks) 22-1 to 22-n. Each of receiver blocks 22-1 to 22-n, in turn, supplies a corresponding copy of data or information streams Data-1 to Data-n in response to the optical signals. It is understood that each of transmitter blocks 12-1 to 12-n has the same or similar structure and each of receiver blocks 22-1 to 22-n has the same or similar structure.

Figure 2:
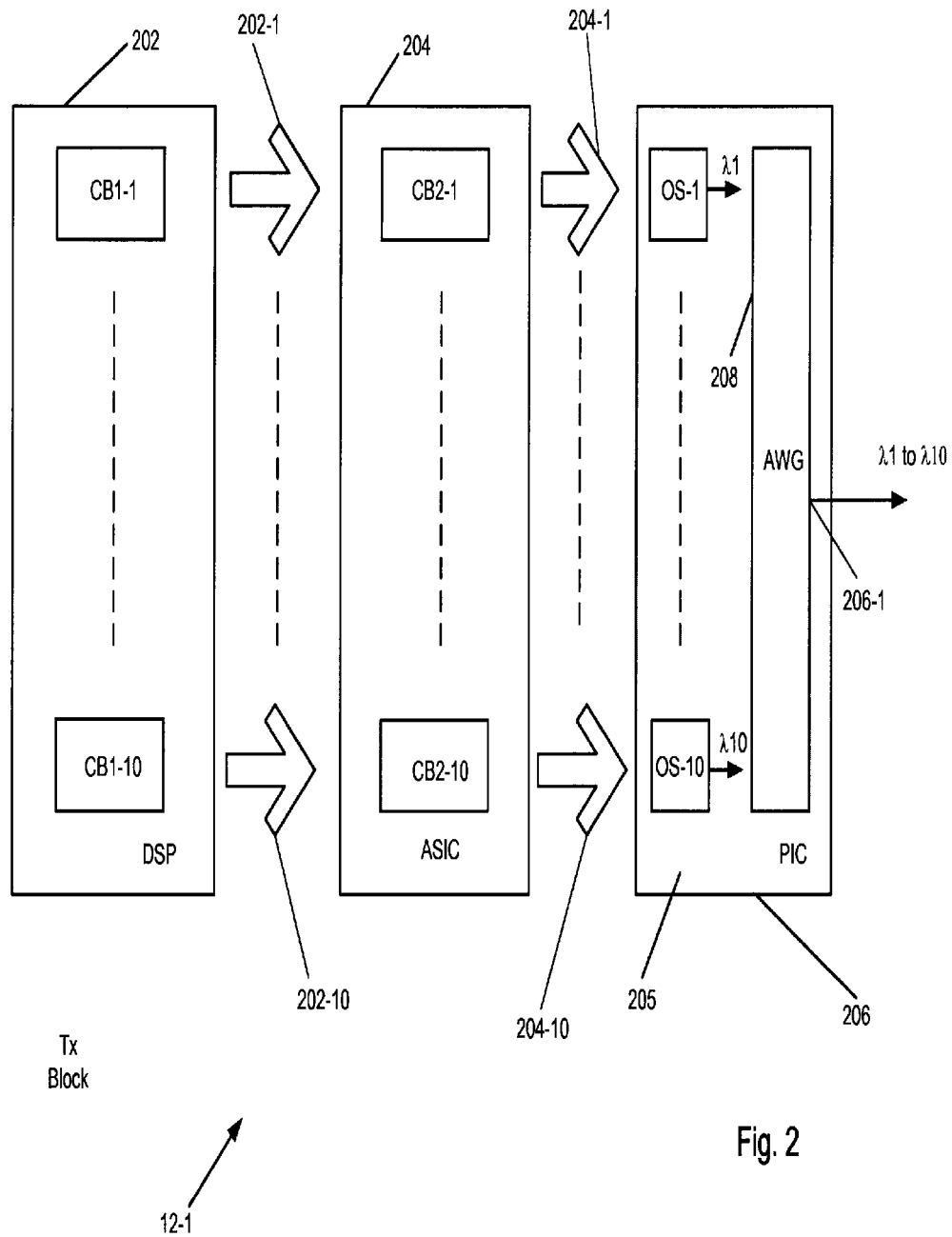
FIG. 2 illustrates a diagram of a transmit block consistent with an additional aspect of the present disclosure.

FIG. 2 illustrates one of transmitter blocks 12-1 in greater detail. Transmitter block 12-1 may include a digital signal processor (DSP) including circuitry or circuit blocks CB1-1 to CB1-10, each of which receiving, for example, a corresponding portion of Data-1 and supplying a corresponding one of outputs or electrical signals to 202-1 to 202-10 to a circuit, such as application specific integrated circuit (ASIC) 204. ASIC 204 include circuit blocks CB2-1 to CB2-10, which supply corresponding outputs or electrical signals 204-1 to 204-10 to optical sources or transmitters OS-1 to OS-2 provided on transmit photonic integrated circuit (PIC) 205. As further shown in FIG. 2, each of optical sources OS-1 to OS-2 supplies a corresponding one of modulated optical signals having wavelengths λ1 to λ10, respectively. The optical signals are combined by an optical combiner or multiplexer, such as arrayed waveguide grating (AWG) 208, for example, and combined into a band or group of optical signals supplied by output 206-1. Alternatively, a known optical power multiplexer may be provided to combine the optical signals. Optical sources OS-1 to OS-10 and multiplexer 208 may be provided on substrate 205, for example. Substrate 205 may include indium phosphide or other semiconductor materials. Although FIG. 2 illustrates ten circuit blocks CB1-1 to CB1-10, ten circuit blocks CB2-1 to CB2-10, and ten optical sources OS1-1 to OS-10, it is understood that any appropriate number of such circuit blocks and optical sources may be provided. Moreover, it is understood, that optical sources OS-1 to OS-10, as well as multiplexer 208, may be provided as discrete components, as opposed to being integrated onto substrate 205 as PIC 206. Alternatively, selected components may be provided on a first substrate while others may be provided on one or more additional substrates in a hybrid scheme in which the components are neither integrated onto one substrate nor provided as discrete devices.

Figure 3:
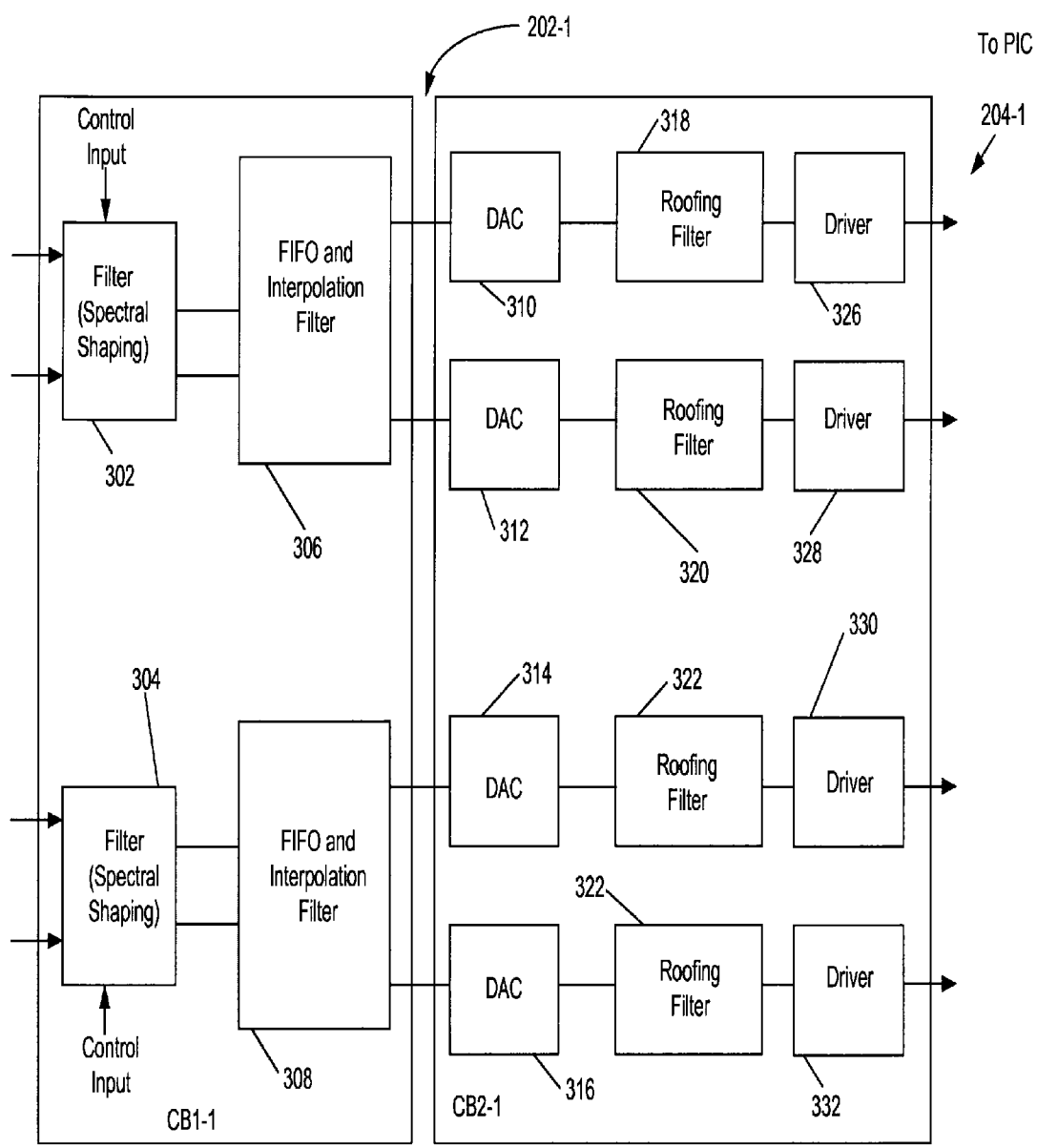
FIG. 3 illustrates a portion of the transmit block shown in FIG. 2 in greater detail.

FIG. 3 illustrates circuit block CB1-1 of DSP 202 and circuit block CB2-1 of ASIC 204 in greater detail. First portions of Data-1 may be processed within DSP circuitry 202 (also referred to as "DSP" herein) and supplied to circuitry, such as digital filter 302 while a second portion of Data-1 may be processed within DSP 202 and supplied to digital filter 304. Digital filters 302 and 304 may operate in a known manner such that modulated optical signals supplied by optical source OS-1, for example, have a desired spectral shape or bandwidth. Such spectral shaping may be desirable in order to reduce interference with an adjacent channel, as noted above. In one example, DSP 202 and filters 304 and 304 operate on samples ("first samples") of the first and second data portions at a given sample or sampling rate or data rate. Digital filters 302 and 304 may include known raised-cosine filters implemented with a Fast Fourier Transform (FFT). In addition, as generally understood, digital filters 302 and 304 may have an associated "roll-off" factor ($\alpha$). Consistent with the present disclosure, however, such "roll-off" may be adjustable or changed in response to different control inputs to filters 302 and 304. Such variable roll-off results in digital filters 302 and 304 having a variable or tunable bandwidth. It is understood that the control inputs may be any appropriate signal, information, or data that is supplied to filters 302 and 304, such that the "roll-off" is changed in response to such signal, information or data.

The filtered outputs (electrical signals) or filtered data supplied from filters 302 and 304 are supplied to FIFO and interpolation filter (circuit) blocks 606 and 308. As discussed in greater detail below, these circuit blocks interpolate the first samples and output second samples of the filtered data at a second sampling or data rate, which is typically higher than the first sampling or data rate. FIFO and interpolation filter 306 outputs data samples 202-1a and data samples 202-1b to DACs 310 and 312, respectively, and FIFO and interpolation filter 308 outputs samples 202-1c and 202-1c to DACs 314 and 316, respectively.

Figure 4:
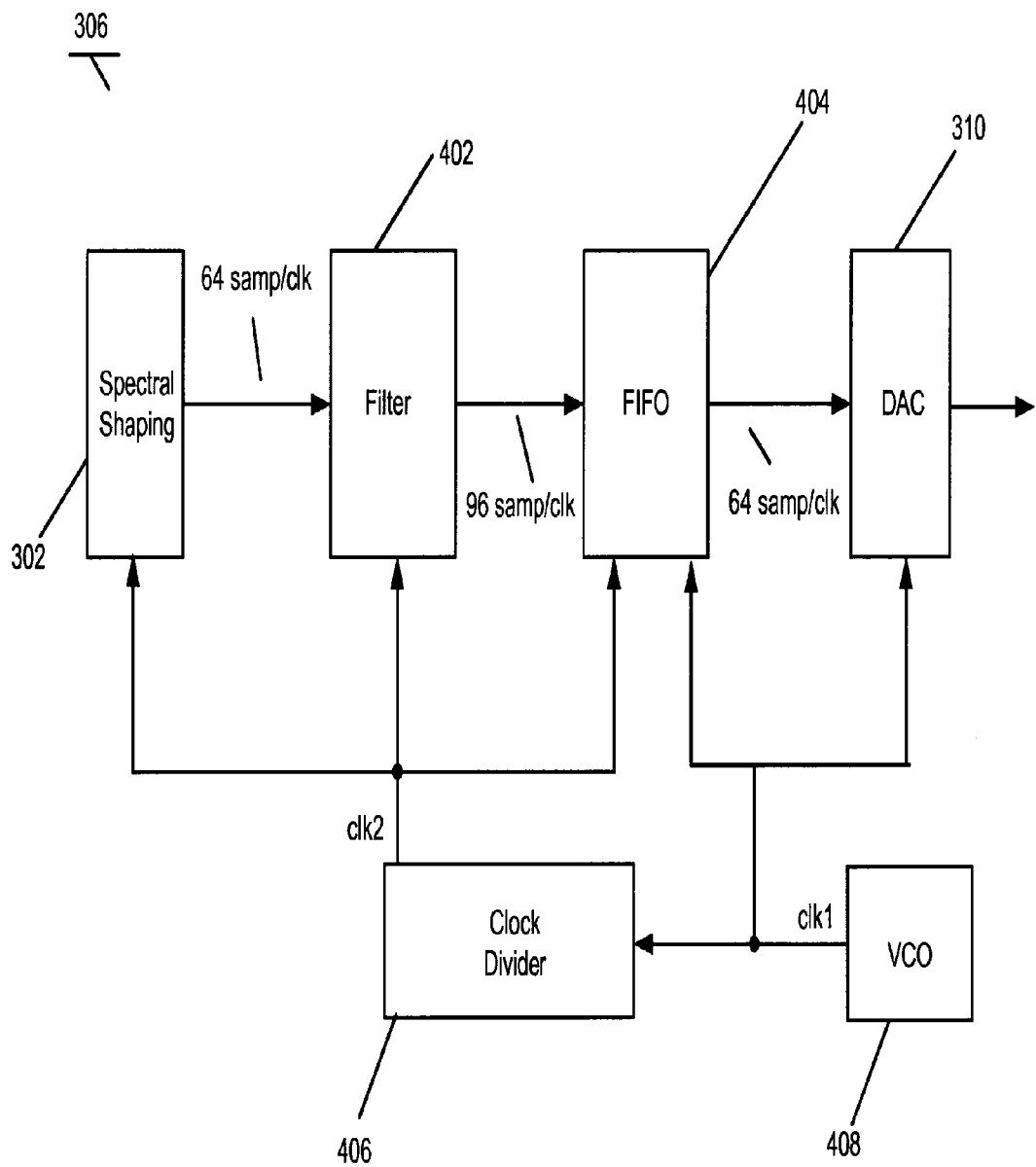
FIG. 4 illustrates an example of an FIFO and interpolation filter circuit consistent with the present disclosure.

A portion of FIFO and interpolation circuit or "interpolation circuit" 306 supplying samples 202-1 a will next be described with reference to FIG. 4.

Interpolation circuit 306 includes a filter, such as a polyphase filter (although another known filter, such as a finite impulse response (FIR) filter may be provided instead) and a memory, such as a first-in-first-out memory (FIFO) 404. Although the memory is shown as a FIFO in the example FIG. 4, the memory may include other suitable memories. Interpolation circuit 306 may also include a voltage controlled oscillator (VCO) 408, as well as clock divider circuit 406. VCO 408 supplies a clock signal clk1 to DAC 310 and clock divider circuit 406, and is used to control an output of FIFO 404. Clock divider circuit 406, in turn, outputs a clock signal clk2 which is slower or has a lower clock rate than clock signal clk1.

In operation, slower clock signal clk2 is supplied to filter 302 such that filter 302 outputs, in this example, 64 samples (302-a) per each cycle of clock signal clk1. Poly-phase filter 402 receives the samples output from output from filter 302 and outputs 96 interpolated samples per cycle of clock signal clk1 to FIFO 404. An input of FIFO 404 receives these 96 samples at a rate associated with clock signal clk2. At the output of FIFO 404, however, these samples (202-1a) are output to DAC 310 at a higher clock rate associated with clock signal clk1. Here, clock signal clk1 has a clock rate that is 3/2 times the clock rate of clock signal clk2. Thus, although 1.5 times the number of samples are input to FIFO 404, such samples are output from FIFO 404 at 1.5 times the rate that they are input to FIFO 404. As a result, the net flow of data samples into and out of FIFO 404 may be the same.

Accordingly, as noted above, DAC 310 may operate at a higher sampling or data rate than filter 302. That is, data is "up sampled" consistent with this aspect of the present disclosure. An advantage associated with such up-sampling will be discussed below with reference to FIG. 10.

It is noted, however, that the present disclosure is not limited to the numbers of samples, sampling rates, clocks, and clock rates discussed above. In addition, other circuitry in FIFO and interpolation filter 306 similar to that shown in FIG. 4 may supply higher rate samples to DAC 312. Further, it is understood that FIFO and interpolation filter 308 has the same or similar structure of FIFO and interpolation filter 306.

Returning to FIG. 3, DACs 310 and 312 output corresponding analog signals in response to output data samples 202-1a and 202-1b from circuit 306, and DACs 314 and 316 output corresponding analog signals in response to samples received from circuit 308. The analog signals output from DACs 310 and 312 are filtered by low-pass or roofing filters 318 and 320 to thereby remove, block or substantially attenuate higher frequency components in these analog signals. Such high frequency components or harmonics are associated with sampling performed by DACs 310 and 312 and are attributable to known "aliasing." The analog signal output from DACs 314 and 316 are similarly filtered by roofing filters 322 and 324. The filtered analog signals output from roofing filters 318, 328, 330, and 332 may next be fed to corresponding driver circuits 326, 328, 330, and 332, which supply modulator driver signals that have a desired current and/or voltage for driving modulators present in PIC 206, as discussed in greater detail below with reference to FIG. 5.

Figure 5:
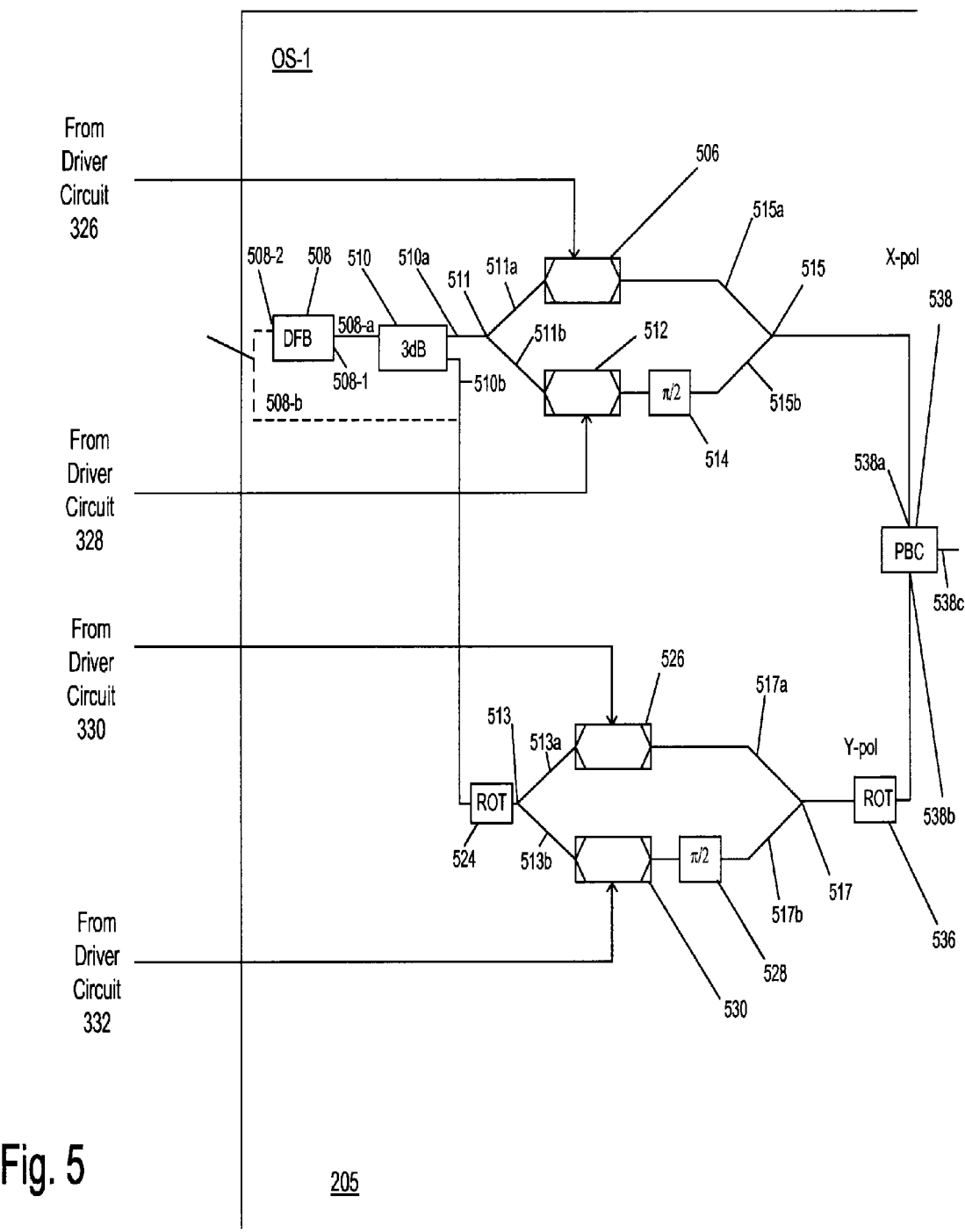
FIG. 5 illustrates a portion of transmit photonic integrated circuit consistent with the present disclosure.

FIG. 5 illustrates transmitter or optical source OS-1 in greater detail. It is understood that remaining optical sources OS-1 to OS-10 have the same or similar structure as optical source OS-1.

Optical source OS-1 may be provided on substrate 205 and may include a laser 508, such as a distributed feedback laser (DFB), that supplies light to at least four (4) modulators 506, 512, 526 and 530. DFB 508 may output continuous wave (CW) light at wavelength 21 to a dual output splitter or coupler 510 (e.g. a 3 db coupler) having an input port and first and second output ports. Typically, the waveguides used to connect the various components of optical source OS-1 may be polarization dependent. A first output 510a of coupler 510 supplies the CW light to first branching unit 511 and the second output 510b supplies the CW light to second branching unit 513. A first output 511a of branching unit 511 is coupled to modulator 506 and a second output 511b is coupled to modulator 512. Similarly, first output 513a is coupled to modulator 526 and second output 513b is coupled to modulator 530. Modulators 506, 512, 526 and 530 may be, for example, Mach Zender (MZ) modulators. Each of the MZ modulators receives CW light from DFB 508 and splits the light between two (2) arms or paths. An applied electric field in one or both paths of a MZ modulator creates a change in the refractive index. In one example, if the relative phase between the signals traveling through each path is 180° out of phase, destructive interference results and the signal is blocked. If the signals traveling through each path are in phase, the light may pass through the device and modulated with an associated data stream. The applied electric field may also cause changes in the refractive index such that a phase of light output from the MZ modulator is shifted or changed relative to light input to the MZ modulator. Thus, appropriate changes in the electric field can cause changes in phase of the light output from the MZ modulator.

Each of the MZ modulators 506, 512, 526 and 530 are driven with data signals or drive signals supplied via driver circuits 326, 328, 330, and 332, respectively. The CW light supplied to MZ modulator 506 via DFB 508 and branching unit 511 is modulated in accordance with the drive signal supplied by driver circuit 326. The modulated optical signal from MZ modulator 506 is supplied to first input 515a of branching unit 515. Similarly, driver circuit 328 supplies further drive signals for driving MZ modulator 512. The CW light supplied to MZ modulator 512 via DFB 508 and branching unit 511 is modulated in accordance with the drive signal supplied by driver circuit 328. The modulated optical signal from MZ modulator 512 is supplied to phase shifter 514 which shifts the phase of the signal 90° ($\pi/2$) to generate one of an in-phase (I) or quadrature (Q) components, which is supplied to second input 515b of branching unit 515. The modulated data signals from MZ modulator 506, which includes the other of the I and Q components, and from MZ modulator 512 are supplied to polarization beam combiner (PBC) 538 via branching unit 515.

Modulator driver 330 supplies a third drive signal for driving MZ modulator 526. MZ modulator 526, in turn, outputs modulated optical signals as one of the I and Q components. A polarization rotator 524 may optionally be disposed between coupler 510 and branching unit 513. Polarization rotator 524 may be a two port device that rotates the polarization of light propagating through the device by a particular angle, usually an odd multiple of 90°. The CW light supplied from DFB 108 is rotated by polarization rotator 124 and is supplied to MZ modulator 526 via first output 513a of branching unit 513. MZ modulator 526 then modulates the polarization rotated CW light supplied by DFB 508, in accordance with drive signals from driver circuit 330. The modulated optical signal from MZ modulator 526 is supplied to first input 517a of branching unit 517.

A fourth drive signal is supplied by driver 332 for driving MZ modulator 530. The CW light supplied from DFB 508 is also rotated by polarization rotator 524 and is supplied to MZ modulator 530 via second output 513b of branching unit 513. MZ modulator 530 then modulates the received optical signal in accordance with the drive signal supplied by driver 332. The modulated data signal from MZ modulator 530 is supplied to phase shifter 528 which shifts the phase the incoming signal 90° ($\pi/2$) and supplies the other of the I and Q components to second input 517b of branching unit 517. Alternatively, polarization rotator 536 may be disposed between branching unit 517 and PBC 538 and replaces rotator 524. In that case, the polarization rotator 536 rotates both the modulated signals from MZ modulators 526 and 530 rather than the CW signal from DFB 508 before modulation. The modulated data signal from MZ modulator 526 is supplied to first input port 538a of polarization beam combiner (PBC) 538. The modulated data signal from MZ modulator 530 is supplied to second input port 538b of polarization beam combiner (PBC) 538. PBC 538 combines the four modulated optical signals from branching units 515 and 517 and outputs a multiplexed optical signal having wavelength λ1 to output port 538c. In this manner, one DFB laser 108 may provide a CW signal to four separate MZ modulators 506, 512, 526 and 530 for modulating at least four separate optical channels by utilizing phase shifting and polarization rotation of the transmission signals. Alternatively, multiple CW light sources were used for each channel which increased device complexity, chip real estate, power requirements and associated manufacturing costs.

Alternatively, splitter or coupler 510 may be omitted and DFB 508 may be configured as a dual output laser source to provide CW light to each of the MZ modulators 506, 512, 526 and 530 via branching units 511 and 513. In particular, coupler 510 may be replaced by DFB 508 configured as a back facet output device. Both outputs of DFB laser 508, from respective sides 508-1 and 508-2 of DFB 508, are used, in this example, to realize a dual output signal source. A first output 508a of DFB 508 supplies CW light to branching unit 511 connected to MZ modulators 506 and 512. The back facet or second output 508b of DFB 508 supplies CW light branching unit nit 513 connected to MZ modulators 526 and 530 via path or waveguide 543 (represented as a dashed line in FIG. 5). The dual output configuration provides sufficient power to the respective MZ modulators at a power loss far less than that experienced through 3 dB coupler 510. The CW light supplied from second output 508b is supplied to waveguide 543 which is either coupled directly to branching unit 513 or to polarization rotator 524 disposed between DFB 508 and branching unit 513. Polarization rotator 524 rotates the polarization of CW light supplied from second output 508b of DFB 508 and supplies the rotated light to MZ modulator 526 via first output 513a of branching unit 513 and to MZ modulator 530 via second output 513b of branching unit 513. Alternatively, as noted above, polarization rotator 524 may be replaced by polarization rotator 536 disposed between branching unit 517 and PBC 538. In that case, polarization rotator 536 rotates both the modulated signals from MZ modulators 526 and 530 rather than the CW signal from back facet output 508b of DFB 508 before modulation.

The polarization multiplexed output from PBC 538, may be supplied to multiplexer 208 in FIG. 2, along with the polarization multiplexed outputs having wavelength λ2 to λ10 from remaining optical sources OS-2 to OS-m. Multiplexer 208, which, as noted above, may include an AWG 204, supplies a group of optical signals to multiplexer 14 (see FIG. 1). It is understood that PICs present in transmitter blocks 12-2 to 12-n operate in a similar fashion and include similar structure as PIC 206 shown in FIGS. 2 and 5.

As noted above, optical signals output from transmitter block 12-1 are combined with optical signals output from remaining transmitter blocks 12-2 to 12-n onto optical communication path 16 and transmitted to receive node 18 (see FIG. 1). In receive node 18, demultiplexer 20 divides the incomings signal into optical signal groupings, such that each grouping is fed to a corresponding one of receiver blocks 22-1 to 22-n.

Figure 6:
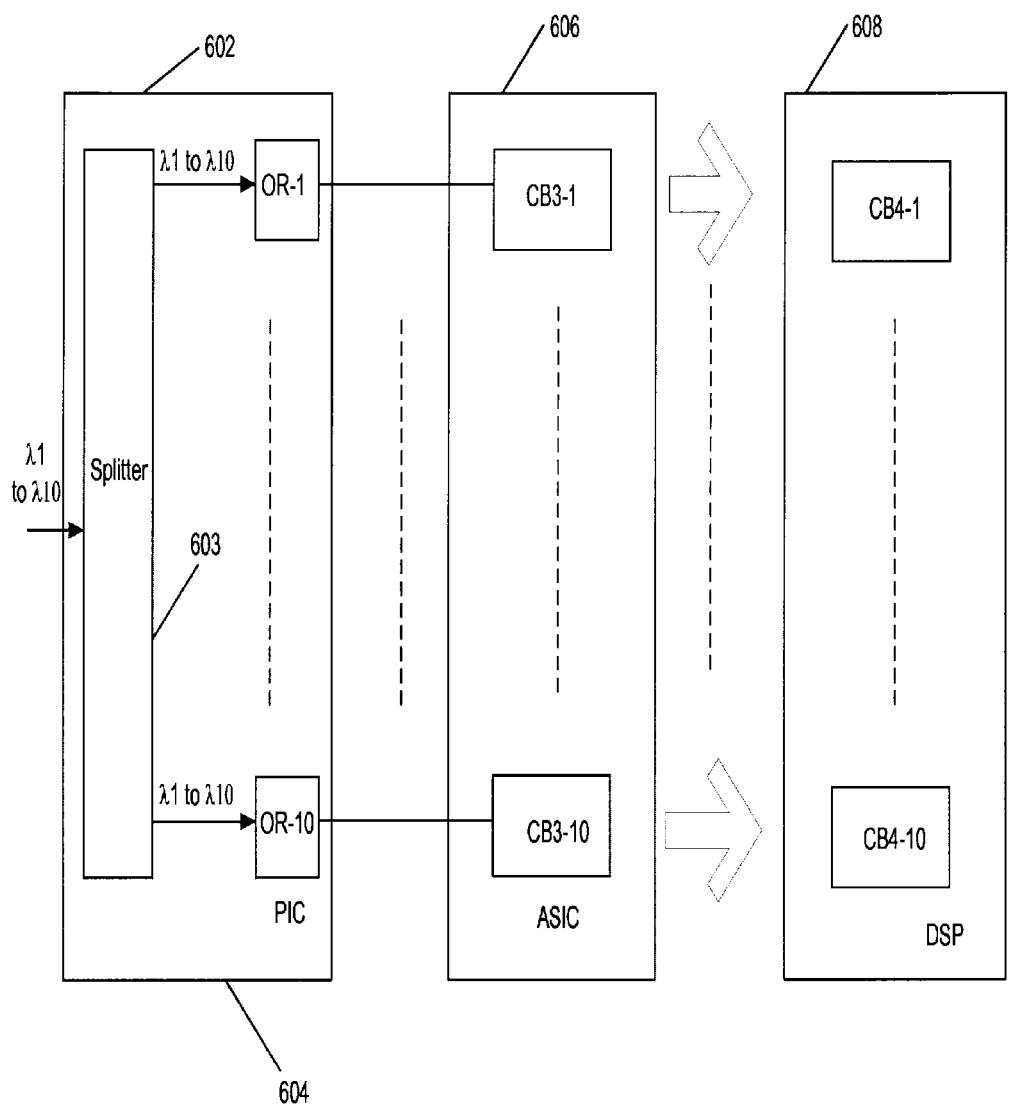
FIG. 6 illustrates a receive block consistent with an aspect of the present disclosure.

One of receiver blocks 22-1 is shown in greater detail in FIG. 6. It is understood that remaining receiver circuitry or blocks 22-2 to 22-n have the same or similar structure as receiver block 22-1.

Receiver block 22-1 includes a receive PIC 602 provided on substrate 604. PIC 602 includes an optical power splitter 603 that receives optical signals having wavelengths 21 to 210, for example, and supplies a power split portion of each optical signal (each of which itself may be considered an optical signal) to each of optical receivers OR-1 to OR-10. Each optical receiver OR-1 to OR-10, in turn, supplies a corresponding output to a respective one of circuit blocks CB3-1 to CB3-10 of ASIC 606, and each of circuit blocks CB3-1 to CB3-10, supplies a respective output to a corresponding one of circuit blocks CB4-1 to CB4-10 of DSP 608. DSP 608, in turn, outputs a copy of data Data-1 in response to the input to circuit blocks CB4-1 to CB4-10.

Figure 7:
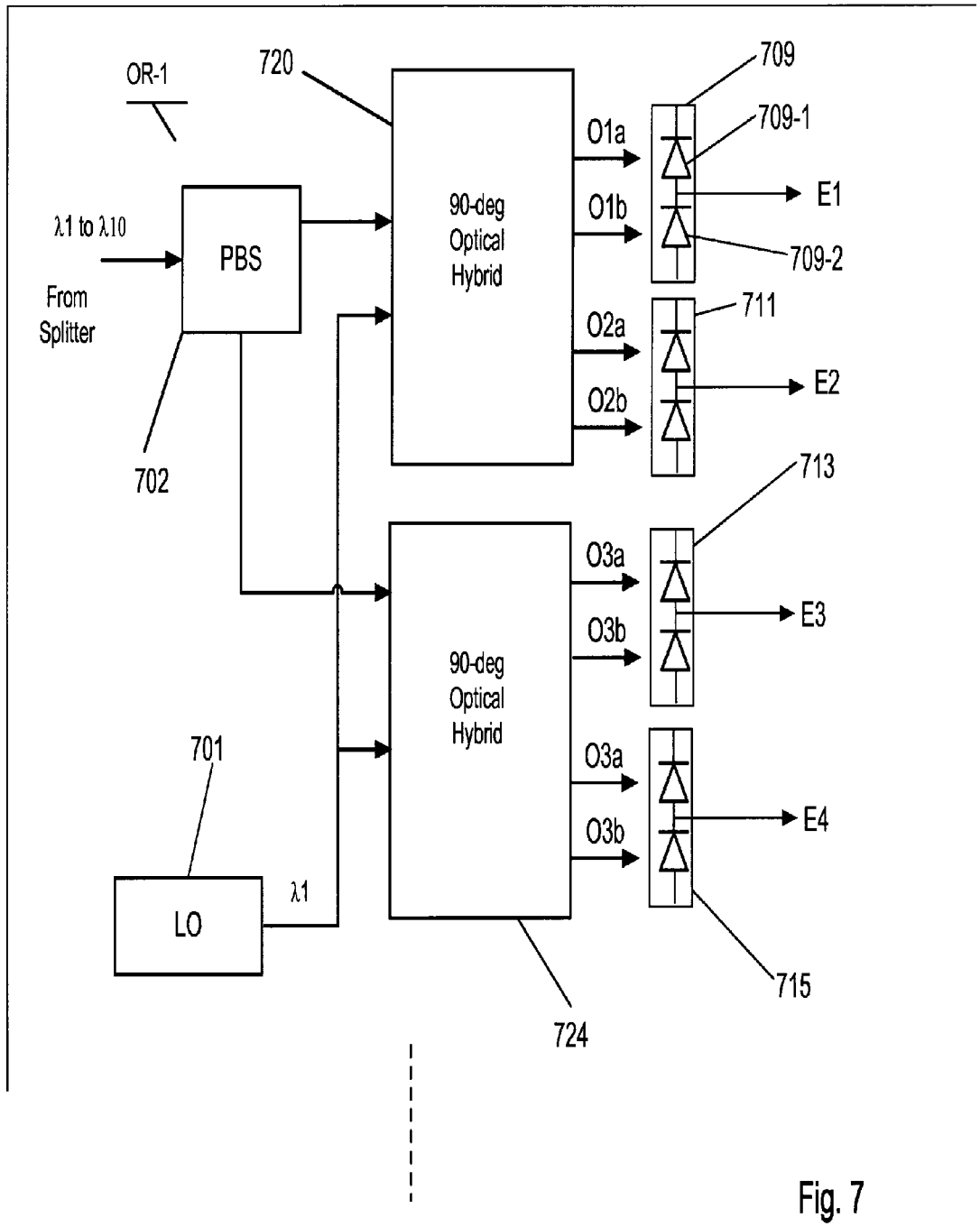
FIG. 7 illustrates a portion of a receiver photonic integrated circuit consistent with the present disclosure.

Optical receiver OR-1 is shown in greater detail in FIG. 7. It is understood that remaining optical receivers OR-2 to OR-10 have the same or similar structure as optical receiver OR-1. Optical receiver OR-1 may include a polarization beam splitter (PBS) 702 operable to receive polarization multiplexed optical signals λ1 to λ10 and to separate the signal into X and Y orthogonal polarizations, i.e., vector components of the optical E-field of the incoming optical signals transmitted on optical fiber medium 108. The orthogonal polarizations are then mixed in 90 degree optical hybrid circuits ("hybrids") 720 and 724 with light from local oscillator (LO) laser 701 having wavelength λ1. Hybrid circuit 720 outputs four optical signals O1a, O1b, O2a, O2b and hybrid circuit 724 outputs four optical signals O3a, O3b, O4a, and O4b, each representing the in-phase and quadrature components of the optical E-field on X (TE) and Y (TM) polarizations, and each including light from local oscillator 701 and light from polarization beam splitter 702. Optical signals O1a, O1b, O2a, O2b, O3a, O3b, O4a, and O4b are supplied to a respective one of photodetector circuits 709, 711, 713, and 715. Each photodetector circuit includes a pair of photodiodes (such as photodiodes 709-1 and 709-2) configured as a balanced detector, for example, and each photodetector circuit supplies a corresponding one of electrical signals E1, E2, E3, and E4. Alternatively, each photodetector may include one photodiode (such as photodiode 709-1) or single-ended photodiode. Electrical signals E1 to E4 are indicative of data carried by optical signals λ1 to λ10 input to PBS 702. For example, these electrical signals may comprise four baseband analog electrical signals linearly proportional to the in-phase and quadrature components of the optical E-field on X and Y polarizations.

Figure 8:
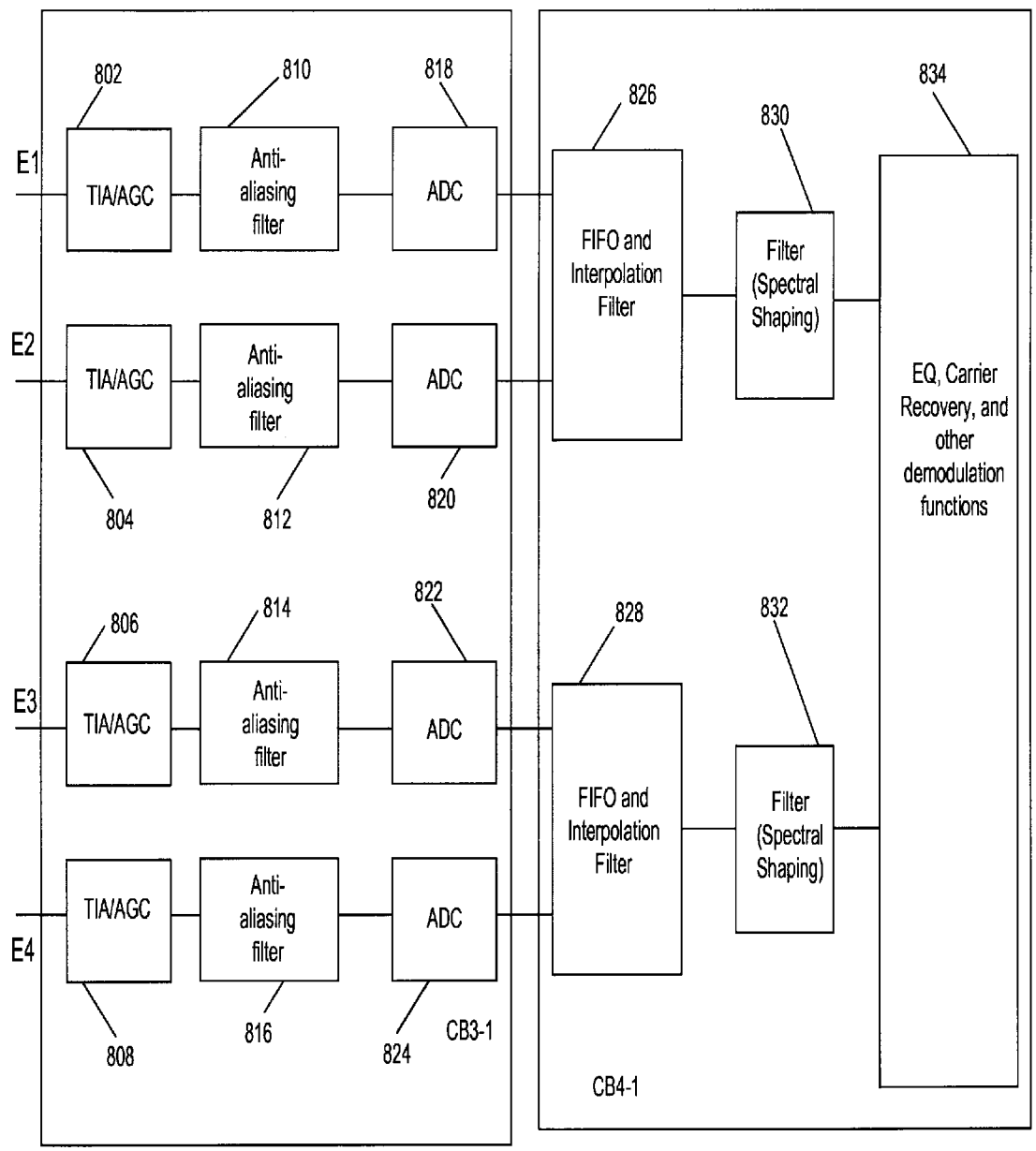
FIG. 8 illustrates a portion of the receive block shown in FIG. 6.

FIG. 8 shows circuitry or circuit blocks CB3-1 and CB4-1 in greater detail. It is understood that remaining circuit blocks CB3-2 to CB3-10 of ASIC 606 have a similar structure and operate in a similar manner as circuit block CB3-1. In addition, it is understood that remaining circuit blocks CB4-2 to CB4-10 of DSP 608 have a similar structure and operation in a similar manner as circuit block CB4-1.

Circuit block CB3-1 includes known transimpedance amplifier and automatic gain control (TIA/AGC 802) circuitry 802, 804, 806, and 808 that receives a corresponding one of electrical signals E1, E2, E3, and E4. Circuitry 802, 804, 806, and 808, in turn, supplies corresponding electrical signals or outputs to respective ones of anti-aliasing filters 810, 812, 814, and 815, which, constitute low pass filters that further block, suppress, or attenuate high frequency components due to known "aliasing". The electrical signals or outputs form filters 810, 812, 814, and 816 are then supplied to corresponding ones of analog-to-digital converters (ADCs) 818, 820, 822, and 824.

ADCs 818, 820, 822, and 824, may sample at the same or substantially the same sampling rate as DACs 310, 312, 314, and 316 discussed above. Preferably, however, circuit block CB4-1 and DSP 608 have an associated sampling rate that is less than the DAC sampling rate. At such a high sampling rate, DSP 608 and its associated circuitry or circuits, would consume excessive power and would require a relatively complex design. Accordingly, in order to reduce the rate that samples are supplied to and processed by DSP 608, FIFO interpolation and filter circuits 826 and 828 are provided to provide samples at a lower sampling rate than that associated with DACs 818, 820, 822, and 824. The operation and structure of FIFO interpolation and filter circuits are described in greater detail in U.S. patent application Ser. No. 12/791,694 titled "Method, System, And Apparatus For Interpolating An Output Of An Analog-To-Digital Converter", filed Jun. 1, 2010, the entire contents of which are incorporated herein by reference.

The electrical signals or outputs of circuits 826 and 828 are provided to filters, such as digital filters 830 and 832, which may perform spectral shaping in a known manner similar to that discussed above in connection with filters 302 and 304 (see FIG. 3) to select a data stream, information stream, or data within a bandwidth associated with filters 830 and 832. Such data or information stream also corresponds to one of the optical signals, e.g., the optical signal having wavelength λ1, polarization, and I or Q component. In addition, the outputs of filter circuits 830 and 832 are next fed to processor circuitry 834 that performs equalization, carrier recovery, and other known demodulation tasks. CB4-1, as noted above, then outputs a copy of data Data-1 from receive node 18.

As noted above, electronic or digital filters in receive node 18, such as filters 830 and 832 electronically separate the data carried by wavelength λ1, as opposed to optically demultiplexing such data. In order to minimize errors in such data attributable to aliasing in transmit node 11, up-sampling of the data output from filters 302 and 304 is performed so that the DACs in transmit node 11 operate at a higher sampling rate than the sampling rate associated with filter 302 and 304. As a result, high frequency harmonics are spectrally spaced from the bandwidth associated with the data to be transmitted, and such harmonics can then be readily filtered by roofing filters 318 and 320, for example. Thus, upsampling in transmit node 11 may facilitate detection and electrical filtering of data carried by an optical signal without optical demultiplexing of individual optical channels.

Figure 9A:
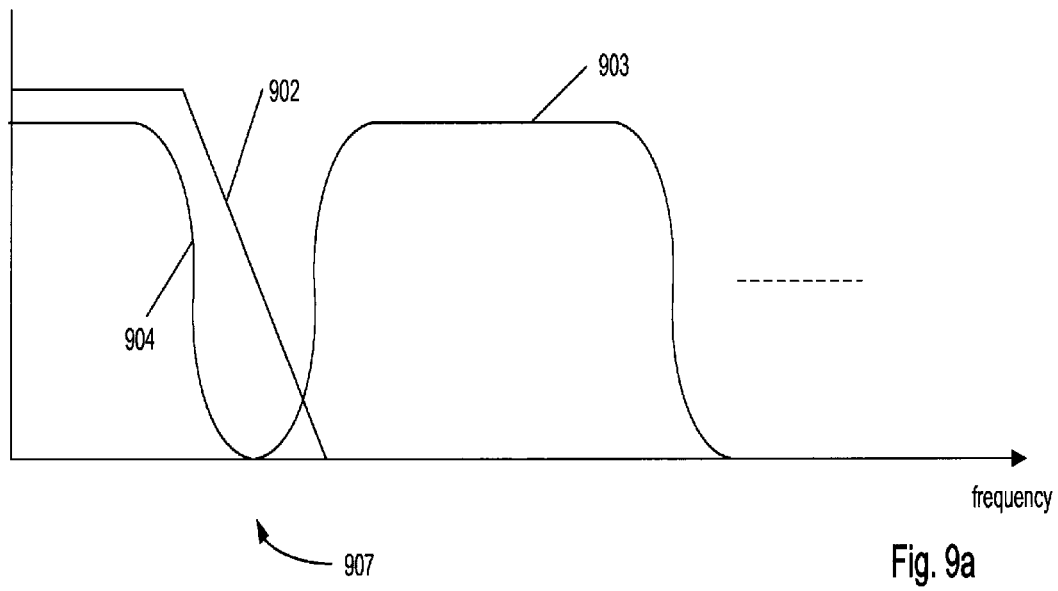
FIGS. 9a and 9b illustrate examples of bandwidth and filter spectra.

Thus, for example, as shown in FIG. 9a, without upsampling, the frequency spectrum associated with data output from spectral shaping filter 302, for example, may be represented by curve 904, and the high frequency harmonics are represented by spectrum 903. The filter characteristic associated with roofing filter 318 is represented by curve 902, which, as shown in FIG. 9a extends over portion 907 of the high frequency harmonics spectrum 903. Thus, portions of the high frequency harmonics are detected as noise in the electrical signals generated by photodiodes in receive node 18, such as those in photodetector circuit 709 (see FIG. 7).

Figure 9B:
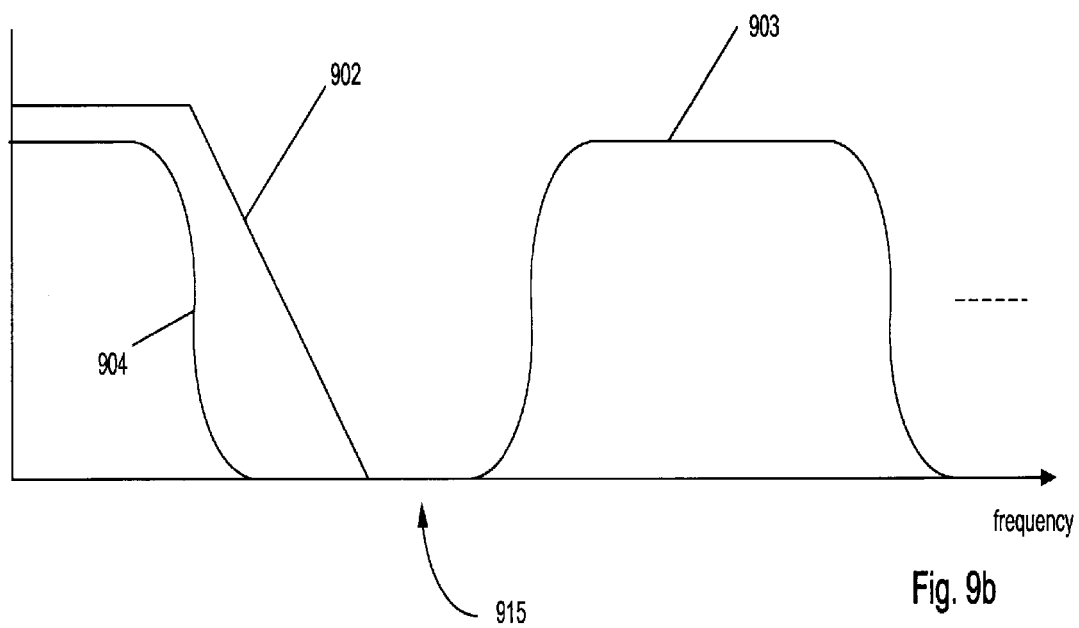

Consistent with the present disclosure, however, when upsampling is carried out, e.g., by FIFO and interpolation filter 306, the higher frequency harmonic spectrum 903 is spaced farther from data bandwidth 904 by a range of frequencies labeled 915 in FIG. 9b. Here, the spectrum or characteristic 902 of roofing filter 318 does not overlap or extend over any portion or any substantial portion of high frequency harmonic spectrum 903. As a result, such harmonics are suppressed in the electrical signals output from photodetector circuit 709, such that errors are reduced and adequate detection of electrically filtered data can be obtained. In addition, roofing filter 318 blocks frequencies associated with adjacent channels, such that channels may be spectrally spaced closer to one another.

Since, as noted above, data associated with an individual wavelength may be electronically filtered or selected, as opposed to being optically demultiplexed, the bandwidth associated with such data, and, thus the channel bandwidth may be varied to accommodate different data rates and modulation formats. In addition, depending on fiber type, channel wavelength and other system parameters, a particular modulation format may provide an optimized (i.e., maximum) capacity for a given distance. Accordingly, a laser in transmit node 11 may be tuned to that channel wavelength and an electronic filter in receive node 18 may be adjusted to accommodate the bandwidth associated with the desired modulation format. Moreover, depending on system parameters, an optimized number of channels having different modulation formats may be provided in order to provide maximum capacity for a given distance.

As an example, assuming an input data rate, fbaud=28 GHz, and a sampling rate of DSP 202 of 37.33 GHz (DSP sampling rate=P×fbaud, where P=4/3). Here, the rolloff can be from 0.1 to 0.33, and programmable or adjustable, as noted above. As further discussed above, the outputs of DSP 202 are interpolated from P*fbaud to Q*fbaud (Q*fbaud being the sampling rate of DAC 310), for example, where $1<P<Q\leq 2$. Further, in this example, analog roofing filter 318, for example, may suppress the digitally sampled spectrum beyond the desired baseband signal BW of 18.67 GHz (see harmonic spectrum 903 discussed above). As a result, the sampling rate of DAC 310 may be set to be higher than that of DSP 202. For example, when Q=2, it is T/2-spaced sampling (T being the period or duration of a symbol or 1/fbaud). The higher the sampling rate of DAC 310, the more separation of the harmonic spectra 903, and as such it is easier to filter out the harmonic spectra. Furthermore, programmable or adjustable rolloff is more readily achievable.

In the above example, a rolloff of less than 0.33 and greater than 0.1 can be obtained. In addition, roofing filter 318, for example, can then be designed to tailor to the highest a and the sampling rate of DAC 310. It is noted that more heat may be generated by ASIC 204 at higher DAC sampling rates. Accordingly, less than T/2-spaced sampling may be chosen, e.g., 5/3*fbaud, which is 46.67 GHz.

As noted above, upsampling shifts the harmonic spectrum 903 to a higher sampling frequency (46.67 GHz as an example), thereby creating a spectrum gap between the desired signal spectrum and the harmonic spectrum. This not only makes the design of roofing filter 318 much easier, but also facilitates or realizes a programmable or adjustable rolloff. In addition, as discussed in greater detail below with reference to FIG. 8, similar interpolation may be done in the receive node, whereby data samples output from an analog-to-digital converter (ADC) having a sampling rate of at Q*fbaud may be down-sampled to a lower sampling rate (P*fbaud) for further signal processing by a DSP. Here, coefficients P and Q may be the same in both receive and transmit nodes, thereby easing design of an analog anti-aliasing filter for programmable rolloff in the receive node (see discussion below).

Examples of systems having a variable electrical or digital filter bandwidth will next be described with reference to FIGS. 10, 11a-11, 12, 13, 14, 15a-15b, and 16.

Figure 10:
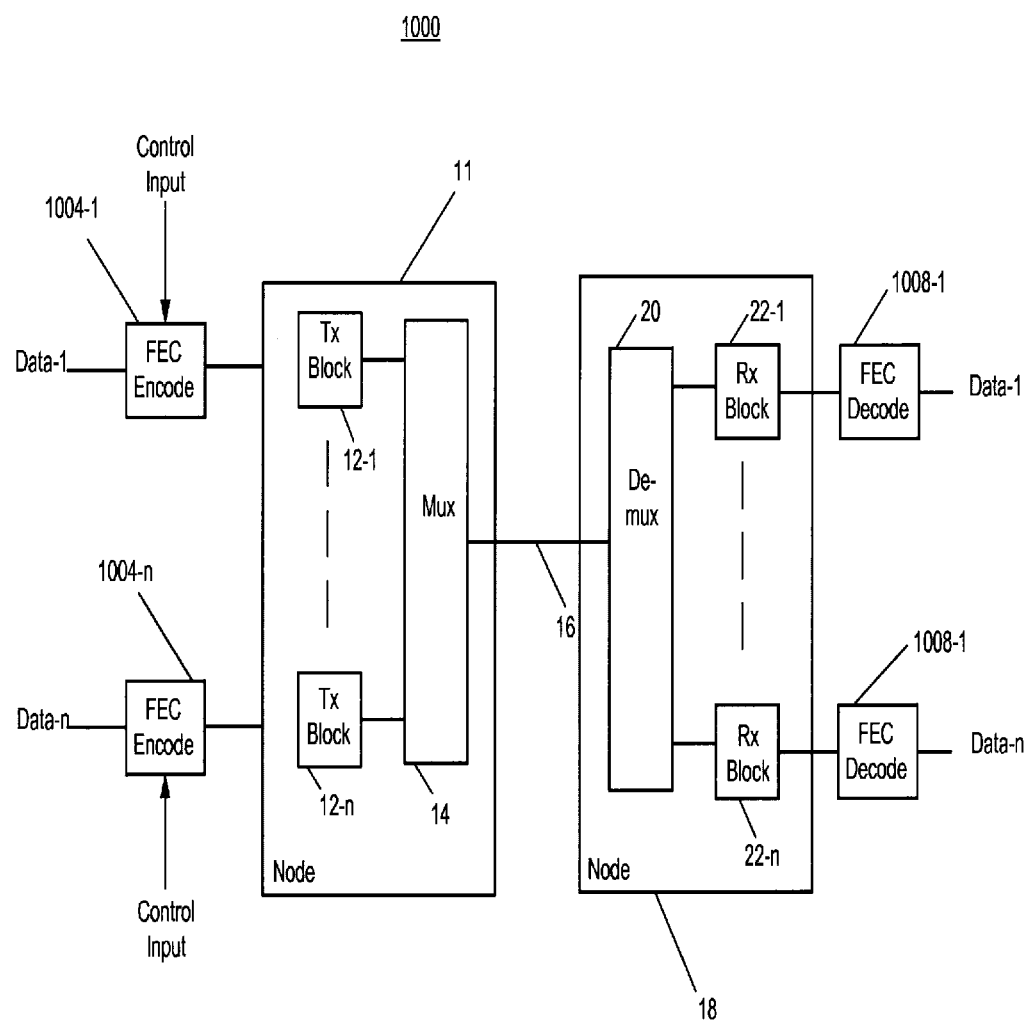
FIG. 10 illustrates an example of a optical communication system consistent with an additional aspect of the present disclosure.

FIG. 10 illustrates an example of an optical communication system 1000 consistent with an additional aspect of the present disclosure. System 1000 includes forward error correction (FEC) encoder circuits 1004-1 to 1004-n that FEC encode data (such as Data-1 to Data-n) supplied to transmit blocks 12-1 to 12-n. After propagating through system 1000, the data carried by optical signals output from transmit blocks 12-1 to 12-n is demultiplexed according to optical channel groupings in receive node 18, processed (as noted above), and then output to FEC decoder circuits 1008-1 to 1008-n. FEC decoder circuits 1008-1 to 1008-n, in turn, decode the outputs from RX blocks 22-1 to 22-n to supply copies of Data-1 to Data-n.

Figure 11A:
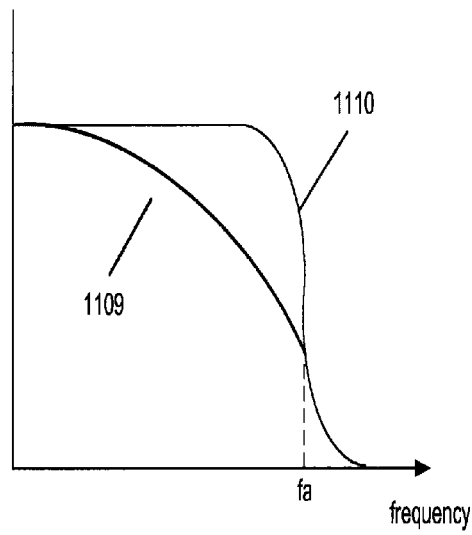
FIG. 11a illustrates an example of a bandwidth consistent with the present disclosure.
Figure 11B:
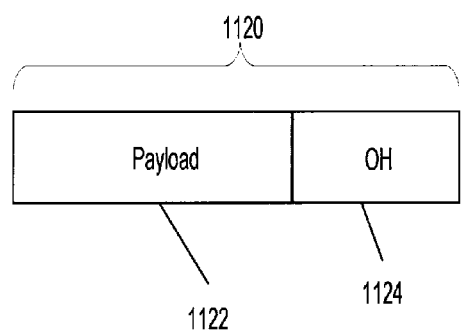
FIG. 11 b illustrates an example of a frame having an overhead consistent with the present disclosure.
FIG. 11c illustrates an example of a bandwidth consistent with the present disclosure.
FIG. 11d illustrates an example of a frame consistent with the present disclosure.
Figure 11C:
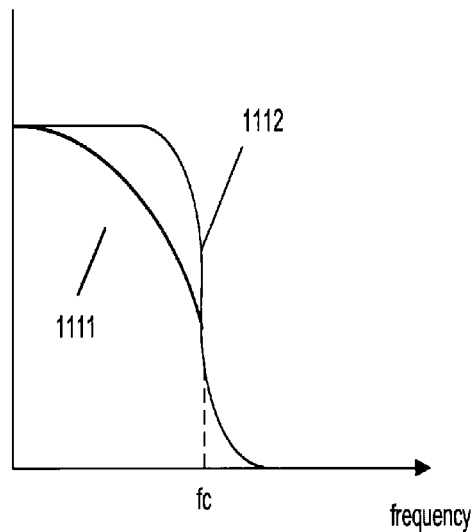
Figure 11D:
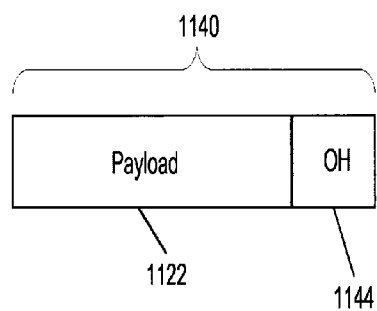

Consistent with the example shown in FIG. 10, a first channel propagating along optical communication 16 may be significantly degraded and may require more FEC encoding than a second channel propagating along path 16. As a result, frames 1120 of data carried by the first channel may resemble that shown in FIG. 11a, which include a payload portion 1122 and overhead portion 1224 with additional error correcting or FEC bytes (FIG. 1120). Accordingly, the amount of data (payload and overhead) carried by frames 1120 is increased, and thus the data, symbol or baud rate associated with frames 1120 is also increased. As a result, frames 1120 have an associated increased channel bandwidth, as indicated by curve 1109, as well as a correspondingly increased filter bandwidth, as indicated by curve 1110 and cutoff frequency fa (FIG. 11a). On the other hand, a second channel that is not significantly degraded may have a frame (see frame 1140, FIG. 11d) with fewer FEC bytes in overhead 1144. The amount of data carried by such a channel (data, symbol or baud rate) is thus less than that of the first channel, and, therefore, the channel bandwidth 1111, as well as the filter bandwidth 1112 is also less (FIG. 11*c*).

Therefore, consistent with an aspect of the present disclosure, those channels requiring less FEC encoding have a narrower bandwidth (e.g., bandwidth 1112 and cutoff frequency fc which is less than fa) and may be spectrally spaced closer to one another than those channel requiring more FEC encoding (e.g., bandwidth 1110) and more bandwidth. The electrical filtering discussed above (e.g., filtering in the electrical, as opposed to the optical domain) can readily accommodate such varying bandwidths, such that, for example, if channel degradation improves, fewer FEC bytes are provided in the frame overhead, and the resulting bandwidth of the channel can be rendered more narrow to accommodate additional channels.

In one example, different control inputs CI-1 may be supplied to FEC encoder circuit 1004-1 to adjust the amount of FEC encoding or the number of error correcting bits or bytes output therefrom and included in each frame output from Tx block 12-1. In addition, different control input CI-n may be supplied to control or adjust the number of error correcting bits or bytes output therefrom and included in each frame output from Tx block 12-*n*. In another example, the number of error correcting bits in each frame output from Tx block 1004-1 (as well as output FEC encoder circuit 1004-1) may be less than the number of error correcting bits in each frame output from Tx block 1004-2 (as well as output from FEC encoder circuit 1004-*n*). It is understood that the control input may be any appropriate signal, information, or data that is supplied to the encoder circuit, such that the number of error correcting bits in each frame is changed in response to such signal, information or data.

Figure 12:
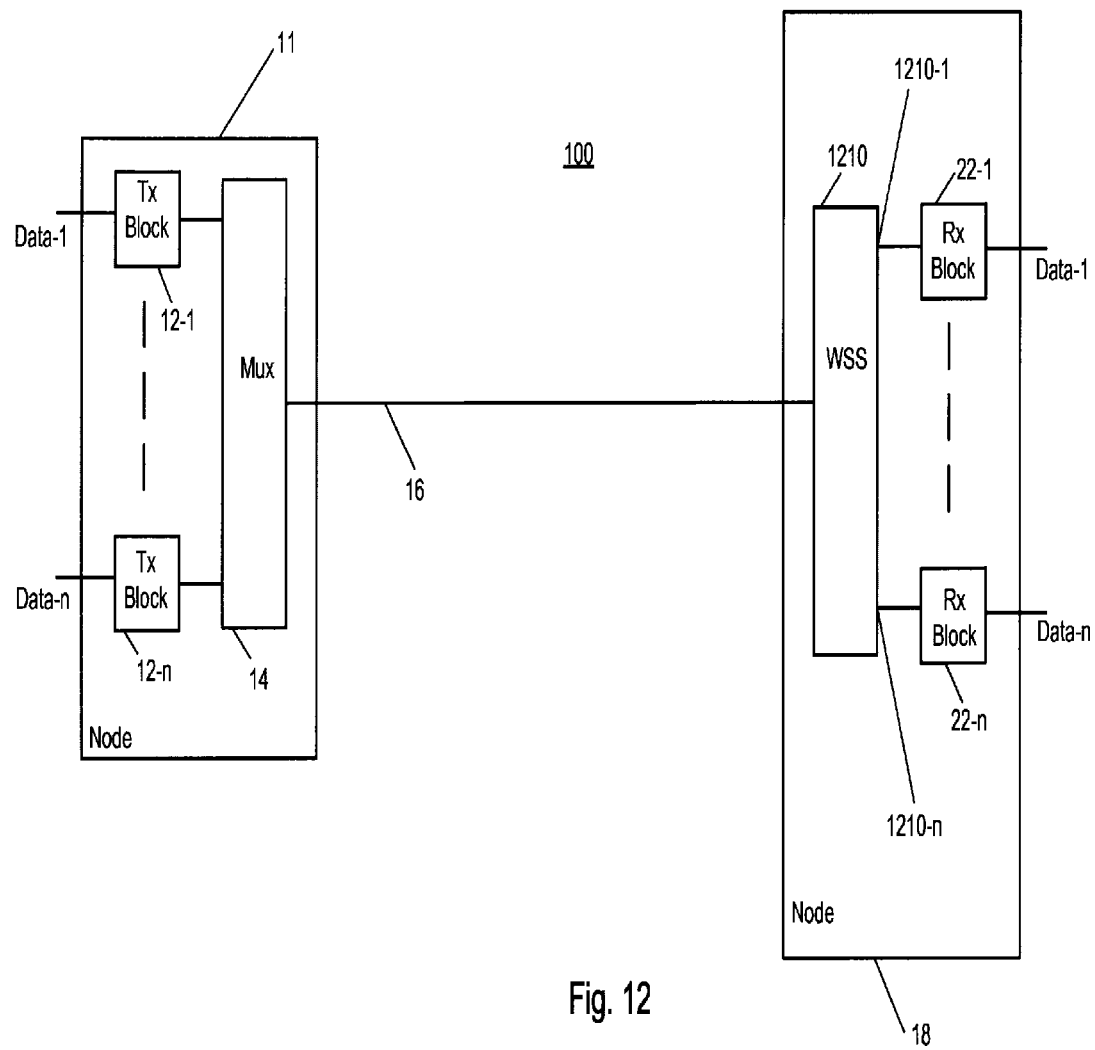
FIG. 12 illustrates a further example of an optical communication system consistent with the present disclosure.
Figure 13:
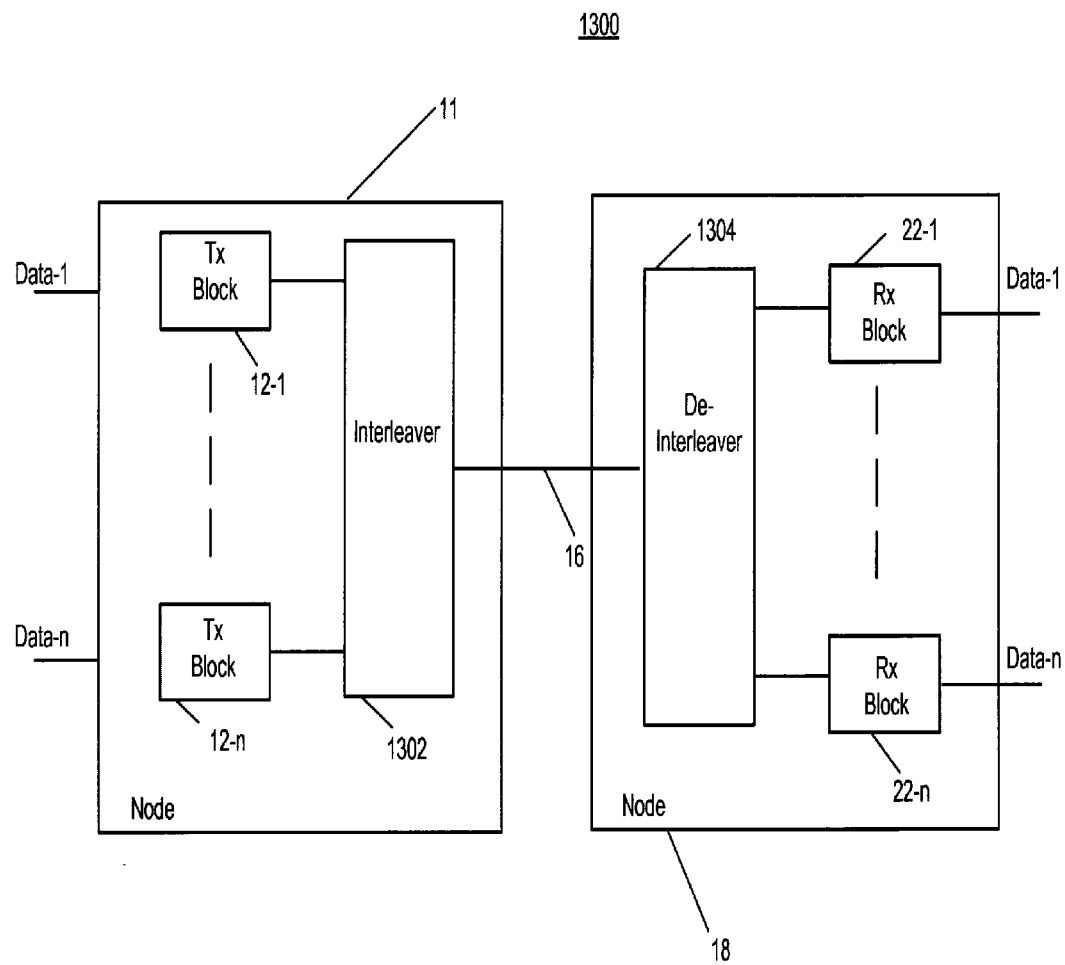
FIG. 13 illustrates an additional example of an optical communication system consistent with the present disclosure.

FIG. 12 illustrates another example in switch demultiplexer 20 shown in FIG. 1 is replaced by a known wavelength selective switch (WSS). As generally understood and depending on system requirements, WSS 1210 may be configured to output first optical signals from path 16 having wavelengths within a first range or optical bandwidth from a first port 1210-1 and output wavelengths within a second range from a second port 1210-*n*. Consistent the present disclosure, additional optical signals having associated bandwidths may be supplied from either one or both ports 1210-1 and 1210-*n* in order to maximize the number of optical signals supplied from each port. Alternatively, optical signals modulated in accordance with a modulation format requiring additional bandwidth or optical signals requiring additional FEC overhead may be output through a port of WSS 1210 that has a relatively large optical bandwidth, while optical signals having a relative narrow bandwidth may be output through a port of WSS 1210 that has a narrow optical bandwidth.

In the above examples, the optical signals output from transmit blocks 12-1 to 12-*n* are "banded" in that the wavelength of each optical channel supplied from one transmit block is not between the wavelengths of optical signals output from another transmit block. Consistent with another aspect of the present disclosure, however, multiplexer 14 may be replaced by a known optical interleaver 1302 in system 1300 to spectrally interleave the optical channels that propagate along optical path 16. In addition, demultiplexer 20 may be replaced by a known de-interleaver 1304. Accordingly, in this example, the wavelengths of optical signals output from transmit block 12-1 are relatively far apart from each other, spectrally, to accommodate the wavelengths of optical signals from other transmit blocks 12-1.

Figure 14:
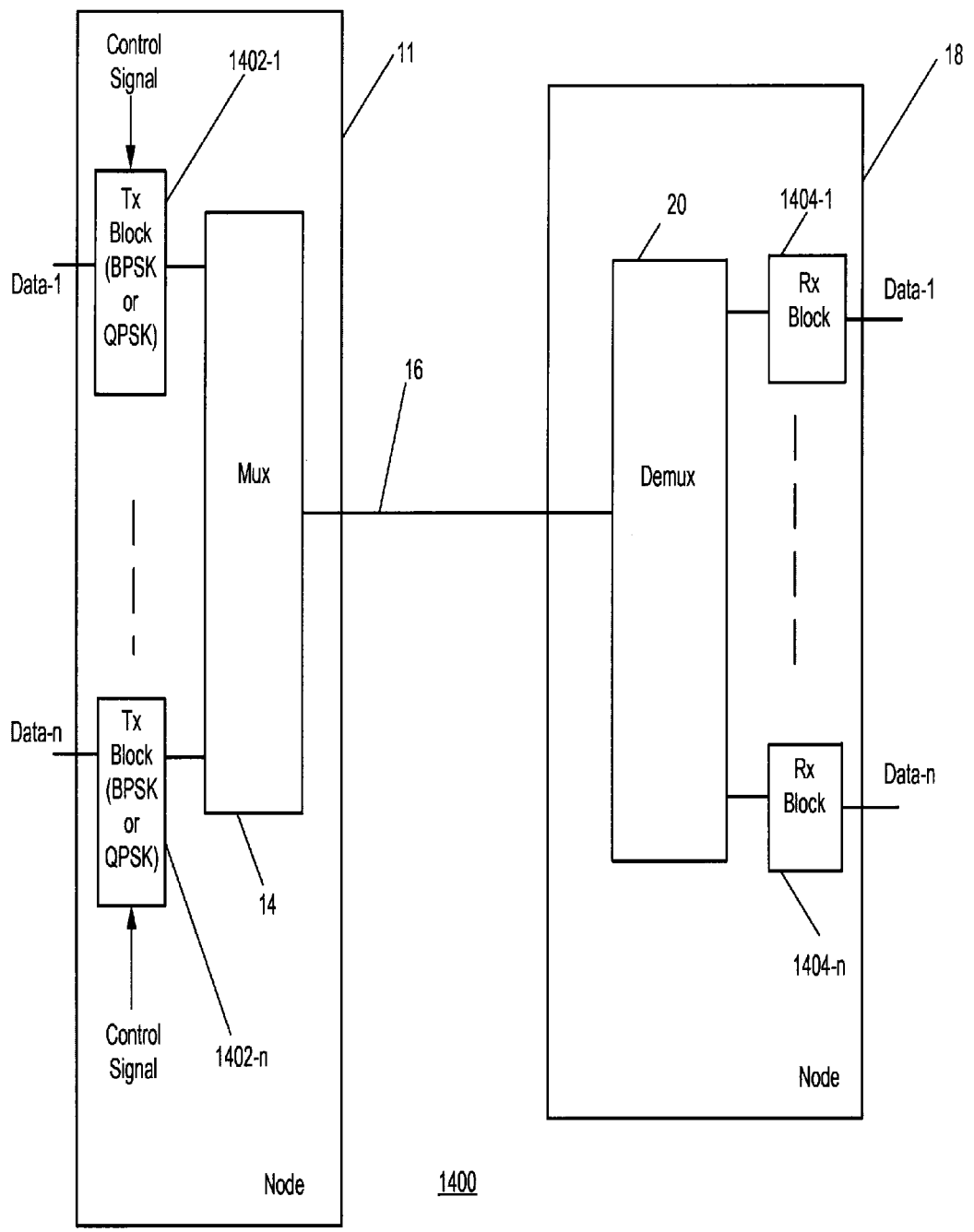
FIG. 14 illustrates another example of an optical communication system consistent with the present disclosure.

FIG. 14 illustrates another example, in which selected transmit blocks, such as transmit block 1402-1, output optical signals, which have been modulated in accordance with a first modulation format, and other transmit blocks, such as transmit block 1402-*n*, that output modulated optical signals having a second modulation format. As generally understood, different modulation format may have wider or narrower bandwidths than other modulation modulation formats. For example, the first modulation format may be a binary phase shift keyed (BPSK) modulation format and the second modulation format may be a quadrature phase shift keyed (QPSK) modulation format.

In one example, in response to a first control signal supplied to TX block 1402-1, TX block 1402-1 may output a first optical signal modulated in accordance with a first modulation format, such as a BPSK modulation format. Moreover, in response to a second control signal supplied to TX block 1402-1, TX block 1402-1 may output a second optical signal modulated in accordance with a second modulation format, such as QPSK. Further, in response to a third control signal supplied to TX block 1402-*n*, TX block 1402-*n* may output a third optical signal modulated in accordance with the first modulation format, such as the BPSK modulation format. Moreover, in response to a fourth control signal supplied to TX block 1402-*n*, TX block 1402-*n* may output a second optical signal modulated in accordance with a second modulation format, such as QPSK. Alternatively, in a similar manner, control signals may be supplied such that the TX blocks selectively output 8-QAM or higher modulation format optical signals.

As further shown in FIG. 14, a grouping of optical signals having the first modulation format may be input to and supplied by demultiplexer 20 to receive block 1404-1 and optical signals having the second modulation format may be input to and supplied by demultiplexer 20 to receive block 1404-1. Electronic or digital filters in the transmit (1402) and receive (1404) may have adjustable bandwidths to select data carried by optical signal modulated in accordance with the first or second bandwidths, as the case may be.

Figure 15A:
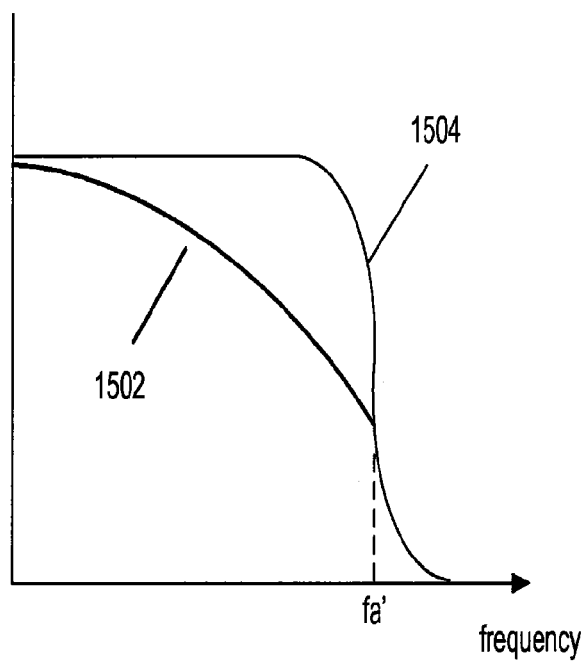
Figure 15B:
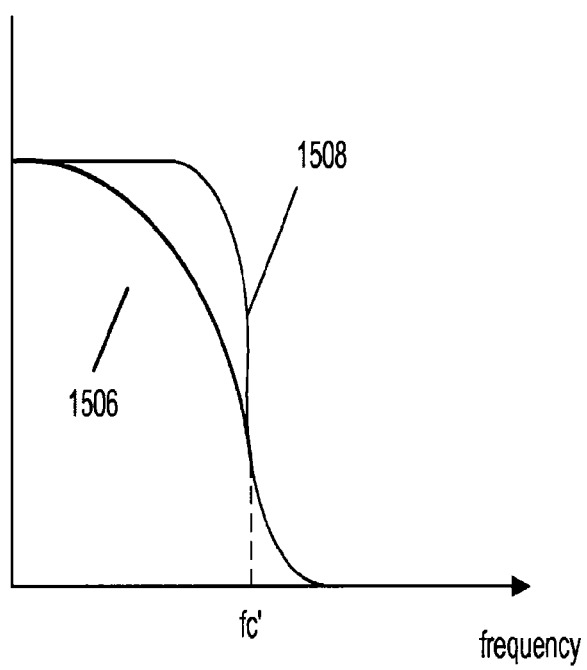

For example, as shown in FIG. 15*a*, electronic or digital filter bandwidth 1504 (having cutoff frequency fa') may be relatively large to select and/or filter the channel bandwidth or modulation spectrum 1502 of a BPSK modulated optical signal. On the other hand, electronic or digital filter bandwidth 1508 (having cutoff frequency fc') may be adjusted to be relatively narrow to accommodate or filter relatively narrow bandwidth or modulation spectrum 1506 associated with a QPSK optical signal carrying data at the same rate, for example, as the BPSK modulated optical signal. It is understood, however, that if the BPSK modulated optical signal carries data at half of the data rate associated with bandwidth spectrum 1502 (a so-called "half-rate" signal), spectrum 1502 would have the same or substantially the same bandwidth as spectrum 1506.

Consistent with a further aspect of the present disclosure, transmit block 1402-1 may output 8-QAM modulated optical signals having a relatively narrow bandwidth. For example, as shown in FIG. 15*c*, electronic or digital filter bandwidth 1510 (having cutoff frequency fc") may be adjusted to be relatively narrow to select and/or filter the channel bandwidth or modulation spectrum 1508 of an 8-QAM modulated optical signal. For a given data rate, the 8-QAM modulated optical signal will have an associated bandwidth that is less than a QPSK modulated optical signal carrying data at the same rate as the 8-QAM modulated optical signal. Typically, for a given data rate, the bandwidth of n-QAM modulated optical signals (where n=16, 32, . . . ) decreases with increasing n.

Figure 16:
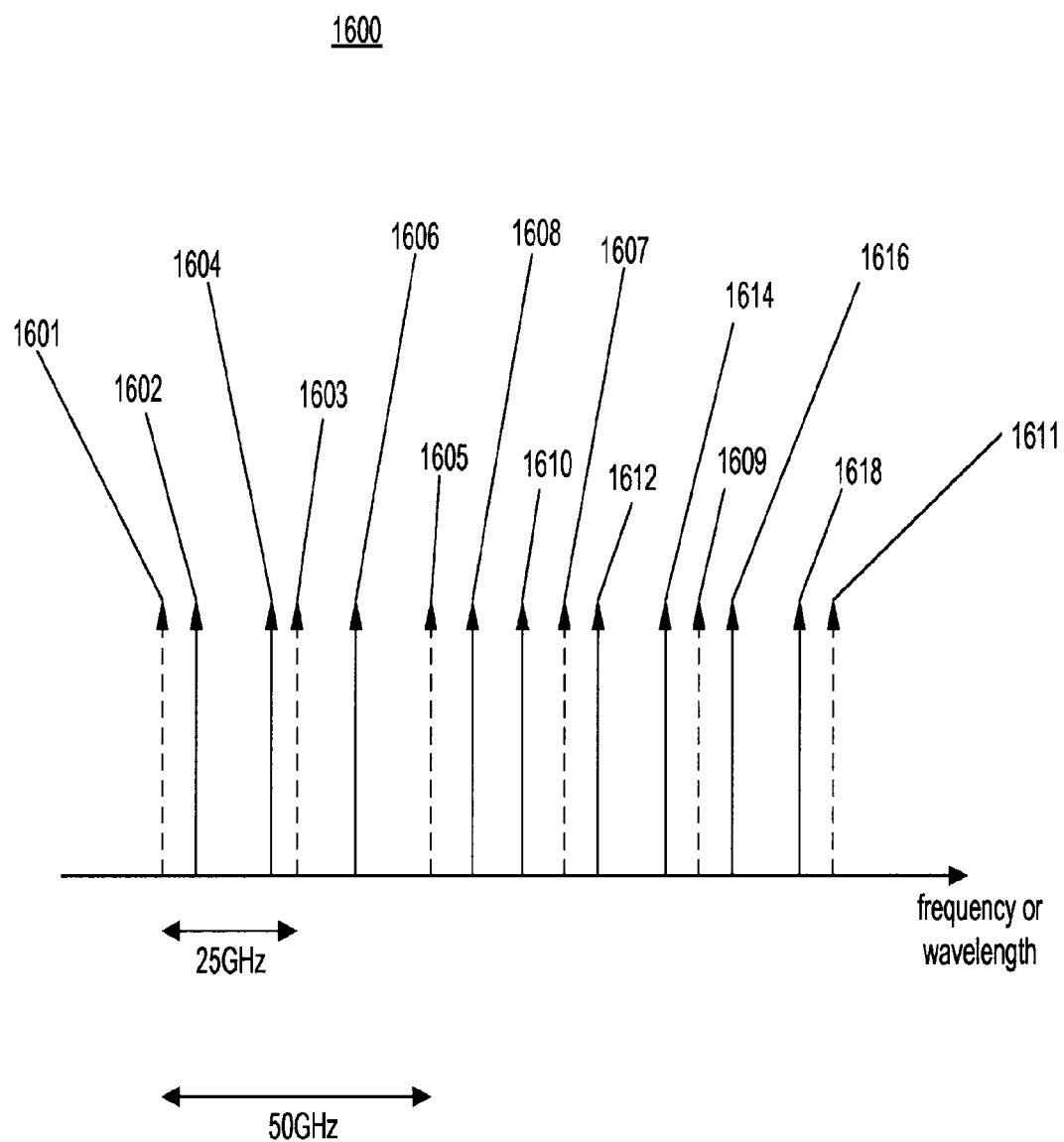
FIG. 16 illustrates an example of a channel plan consistent with the present disclosure.

In a further example, FIG. 16 illustrates a channel plan 1600 including wavelengths, which are represented by solid arrows 1602, 1604, 1606, 1608, 1610, 1612, 1614, 1616, and 1618. Channel plan 1600 may represent the wavelengths of optical signals supplied by the Tx blocks discussed above and received by the Rx blocks, also discussed above. Here, the spectral spacing between adjacent ones of these wavelengths is less than 50 GHz, and preferably less than 25 GHz. Moreover, the spacing between pairs of adjacent wavelengths may differ. For example, the spacing between wavelengths represented by arrows 1602 and 1604 is different than the spacing between wavelengths represented by arrows 1608 and 1610.

As further shown in FIG. 16, an International Telecommunications Union (ITU) grid having both 25 and 50 Ghz spacing (as represented by dashed arrows 1601, 1603, 1605, 1607, 1609, and 1611) is superimposed on channel plan 1600 to illustrate that the spacing between the optical channels represented by the solid arrows is different, and non-uniform, relative the spacing associated with the ITU grid. Such non-uniform channel spacing may result from different electrical filter bandwidths.

Thus, for example, if certain channels are more susceptible to transmission impairments over longer distances than other channels, such channels may be modulated in accordance with a modulation format, such as BPSK that is less susceptible to such impairments. Other channels that do not suffer from the transmission impairments over such long distances may be transmitted in accordance with a more spectrally efficient modulation format, such as QPSK or 8-QAM. Alternatively, such optical channels may be transmitted over shorter distances. Since the bandwidths associated with such modulation formats may differ, for example, BPSK modulated optical signals have a higher bandwidth than QPSK and 8-QAM modulated optical signals carrying data at the same rate, electronic filters having bandwidths tailored for each modulation format may be readily provided. The spectral spacing between channels may thus be non-uniform whereby BPSK modulated optical signals, for example, may be spectrally farther apart than QPSK or 8-QAM modulated optical signals. Moreover, channels may be provided spectrally closer to one another than would otherwise be the case if the channels were to conform to an ITU grid.

In another example, one or more of the optical signals discussed above may be modulated to carry data at a data rate greater than or equal to 40 Gbits/second. Moreover, consistent with a further aspect of the present disclosure, one or more of the optical signal may be modulated to carry data at a data rate greater than or equal to 100 Gbits/second, and such 100 Gbits/second optical signals may be transmitted along with 40 Gbit/second optical signals.

Figure 17:
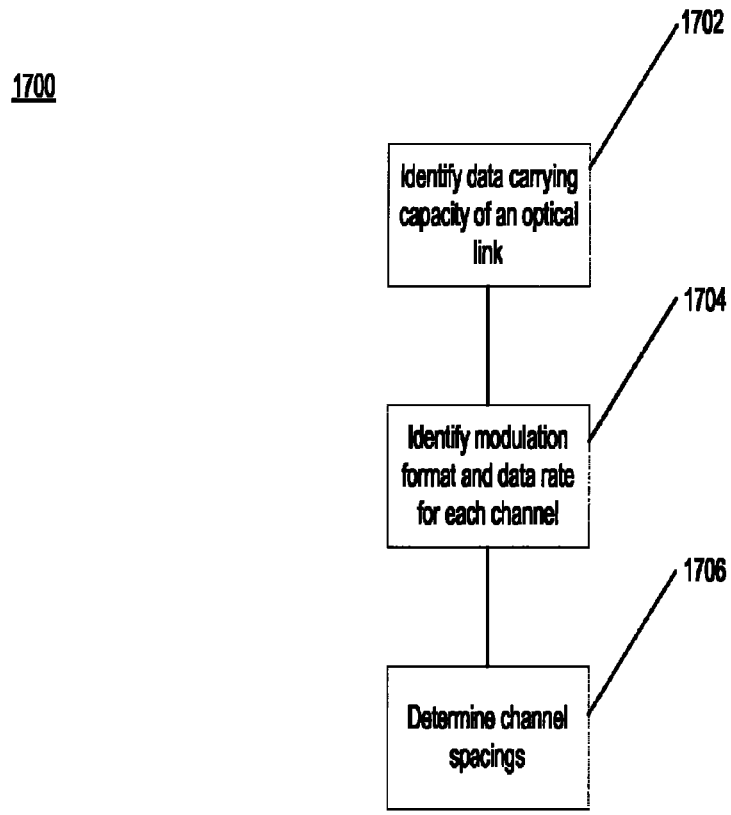
FIG. 17 illustrates a flow chart in connection with a method consistent with a further aspect of the present disclosure.

A method consistent with a further aspect of the present disclosure will next be described with reference to flowchart 1700 shown in FIG. 17. In a first step 1702, a data carrying capacity of an optical link is identified. The optical link, such as optical link or system 100, may include transmit node 11 and receive node 18, as noted above in connection with the description of FIG. 1. As further noted above, such an optical link is configured to carry a plurality of optical signals, each of which having a corresponding one of a plurality of wavelengths. The method further includes, for each of the plurality of optical signals, identifying one of a plurality of modulation formats, such as BPSK, QPSK, and 8-QAM, and one of a plurality of data rates, such as 40 Gbits/second and 100 Gbits/second (step 1704). In addition, the method includes determining a spectral spacing between adjacent ones of the plurality of wavelengths (step 1706). As a result of the above steps, when each of the plurality of optical signals is modulated in accordance with a corresponding identified one of the plurality of modulation formats, carries data at a corresponding one of the plurality of data rates, and the plurality of wavelengths conform to the spectral spacing, the data carrying capacity of the optical link is optimized and the desired capacity is obtained. As further noted above, the channel spacing in such an optimized system or link may be less than 25 GHz and may not conform to an ITU grid.

As further discussed above, optical communication systems may be provided with electrical filters having varying bandwidths. As a result, optical signals having different modulation formats, different levels of FEC encoding, and close, non-uniform channel spacings may transmitted over different distances and detected so that system capacity may be optimized, and thus increased.

Other embodiments will be apparent to those skilled in the art from consideration of the specification. It is intended that the specification and examples be considered as exemplary only, with a true scope and spirit of the invention being indicated by the following claims.

What is claimed is:

1. An apparatus, comprising:
a photodiode that receives a portion of each of a plurality of optical signals, each of which being modulated in accordance with a corresponding one of a plurality of data streams, and each having a corresponding one of a plurality of wavelengths, the photodiode supplying an electrical output, each of the plurality of optical signals being supplied by a corresponding one of a plurality of transmitters;
a low-pass filter that supplies a filtered output in response to the electrical output;
an analog-to-digital converter configured to sample the filtered output at a first sampling rate to generate a plurality of first data samples;
an interpolation circuit configured to receive the plurality of first data samples and supply a plurality of second data samples at a second sampling rate less the first sampling rate; and
a digital signal processor circuit configured to receive the plurality of second data samples,
wherein the low pass filter is a first filter, the interpolation circuit includes:
a memory configured that receives the plurality of first data samples at the first sampling rate and outputs a plurality of third data samples at the second sampling rate; and
a second filter configured to receive the third plurality of data samples from the memory at the second sampling rate and output the second plurality of sample at the second sampling rate.

2. An apparatus in accordance with claim 1, wherein the second filter is a finite-impulse response (FIR) filter.

3. An apparatus in accordance with claim 1, wherein the memory includes a first-in-first-out (FIFO) buffer.

* * * * *